United States Patent
Roy et al.

(10) Patent No.: US 12,412,264 B2
(45) Date of Patent: Sep. 9, 2025

(54) SCALE FOR DETERMINING THE WEIGHT OF SHRIMPS

(71) Applicant: XPERTSEA SOLUTIONS INC., Québec (CA)

(72) Inventors: Julien Roy, Québec (CA); Cody Andrews, Shannon (CA); Samuel Couture Brochu, Québec (CA); Marnix Faes, Québec (CA)

(73) Assignee: XPERTSEA SOLUTIONS INC., Quebec (CA)

( * ) Notice: Subject to any disclaimer, the term of this patent is extended or adjusted under 35 U.S.C. 154(b) by 658 days.

(21) Appl. No.: 17/051,506

(22) PCT Filed: May 2, 2019

(86) PCT No.: PCT/CA2019/050581
§ 371 (c)(1),
(2) Date: Oct. 29, 2020

(87) PCT Pub. No.: WO2019/210421
PCT Pub. Date: Nov. 7, 2019

(65) Prior Publication Data
US 2021/0233235 A1    Jul. 29, 2021

Related U.S. Application Data

(60) Provisional application No. 62/666,919, filed on May 4, 2018.

(51) Int. Cl.
*G06T 7/00*     (2017.01)
*A01K 61/90*    (2017.01)
(Continued)

(52) U.S. Cl.
CPC ............ *G06T 7/0012* (2013.01); *A01K 61/90* (2017.01); *A01K 61/95* (2017.01); *G06T 7/73* (2017.01);
(Continued)

(58) Field of Classification Search
CPC ................. G06T 7/0012; G06T 7/73; G06T 2207/20081; G06T 7/11; A01K 61/90;
(Continued)

(56) References Cited

U.S. PATENT DOCUMENTS 3,726,251 A * 4/1973 Fremont ............... A01K 79/00
                                                    119/228
9,410,881 B2 * 8/2016 Robitaille ............. G06M 11/00
(Continued)

FOREIGN PATENT DOCUMENTS

CA        2987285        11/2016
CN     104931120 A        9/2015
(Continued)

OTHER PUBLICATIONS

Bishop, Christopher M. Pattern recognition and machine learning. springer, 2006.
(Continued)

*Primary Examiner* — Umair Ahsan
(74) *Attorney, Agent, or Firm* — Reno Lessard; Norton Rose Fulbright Canada LLP

(57) ABSTRACT

There is described a scale for determining weight of one or more organisms contained in a sample. The scale generally has: a camera having a field of view orientable towards the sample and being configured for acquiring an image of the one or more organisms of the sample; a controller having a memory and a processor configured to perform the steps of: accessing the acquired image; using an organism detection engine being stored on the memory and being trained,
(Continued)

detecting one or more organism representations in one or more corresponding portions of the accessed image and generating detection data concerning the one or more detected organism representations; and using an organism weight determination engine being stored on the memory and being trained, determining weight data concerning weight associated to the one or more detected organism representations based on the detection data.

21 Claims, 19 Drawing Sheets

(51) Int. Cl.
    *A01K 61/95*     (2017.01)
    *A01K 63/06*     (2006.01)
    *G06T 7/73*     (2017.01)
    *G06V 40/10*     (2022.01)

(52) U.S. Cl.
    CPC .............. *G06V 40/10* (2022.01); *A01K 63/06* (2013.01); *G06T 2207/20081* (2013.01)

(58) Field of Classification Search
    CPC ........ A01K 61/95; A01K 63/06; G06V 40/10; G06N 3/088; G06N 20/20; G01G 17/08; G01G 9/00
    See application file for complete search history.

(56) References Cited

U.S. PATENT DOCUMENTS

| | | | |
|---|---|---|---|
| 9,443,314 B1* | 9/2016 | Huang | G06V 20/35 |
| 2013/0223693 A1 | 8/2013 | Chamberlain et al. | |
| 2016/0042249 A1* | 2/2016 | Babenko | G06V 20/46 |
| | | | 382/224 |
| 2019/0228218 A1* | 7/2019 | James | G06T 7/62 |
| 2020/0258313 A1* | 8/2020 | Chen | G06T 7/70 |

FOREIGN PATENT DOCUMENTS

| | | | | |
|---|---|---|---|---|
| CN | 105046228 A | | 11/2015 | |
| CN | 105066885 A | * | 11/2015 | |
| EP | 1925921 A2 | | 5/2008 | |
| EP | 3030867 B1 | | 6/2016 | |
| GB | 2258916 A | | 2/1993 | |
| WO | WO-2012038415 A1 | * | 3/2012 | ............. A01K 61/90 |
| WO | 2012083461 A1 | | 6/2012 | |
| WO | 2016004527 A1 | | 1/2016 | |

OTHER PUBLICATIONS

Odone F. et al., "A Trainable System for Grading Fish From Images", Applied Artificial Intelligence, 15:735-745, 2001.
Zion B, "The use of computer vision technologies in aquaculture—a review", Computers and Electronics in Agriculture 88, 125-132, 2012.
Saberioon M et al., "Application of machine vision systems in aquaculture with emphasis on fish: state-of-the-art and key issues", Reviews in Aquaculture 9, 369-387, 2017.

* cited by examiner

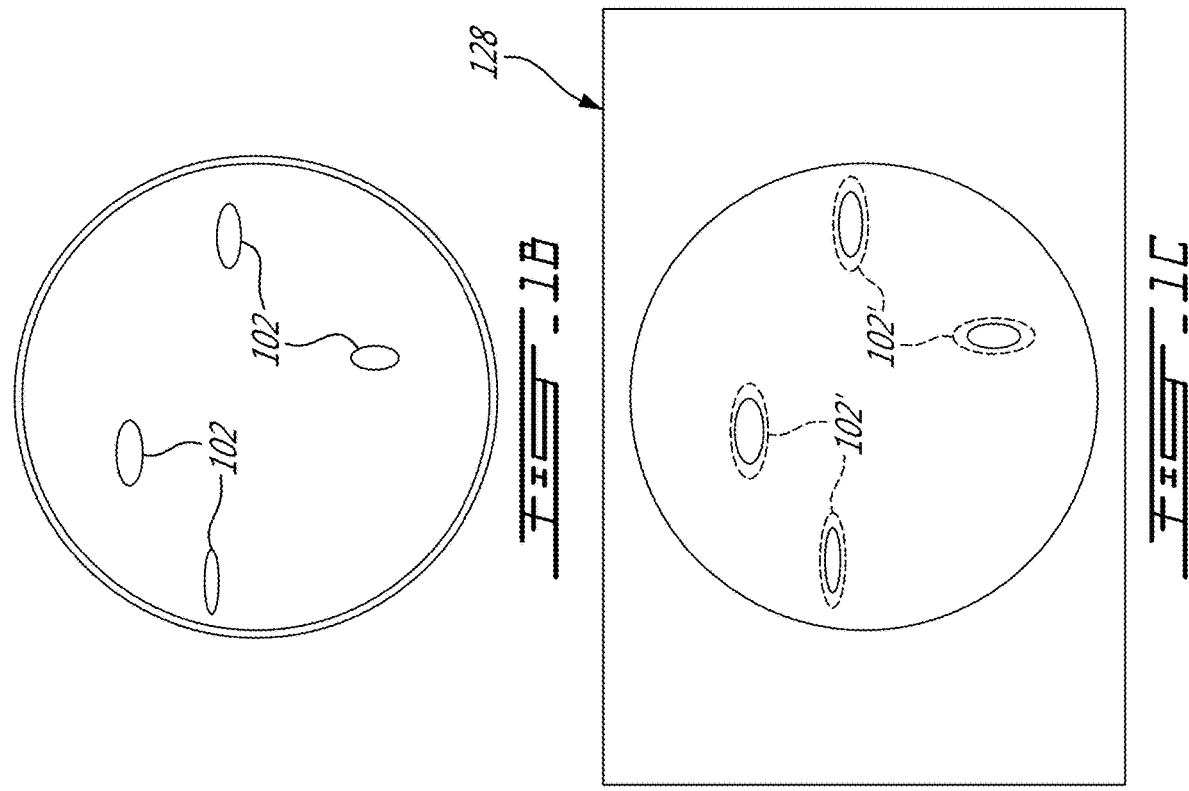
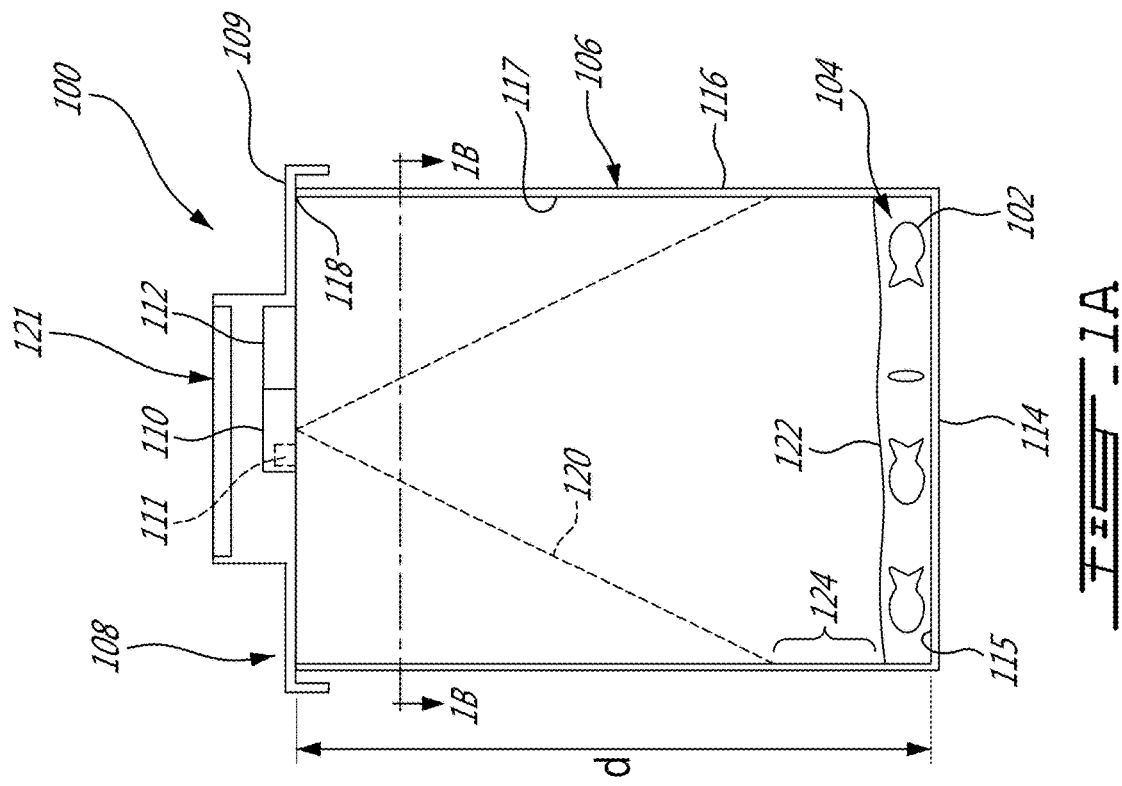

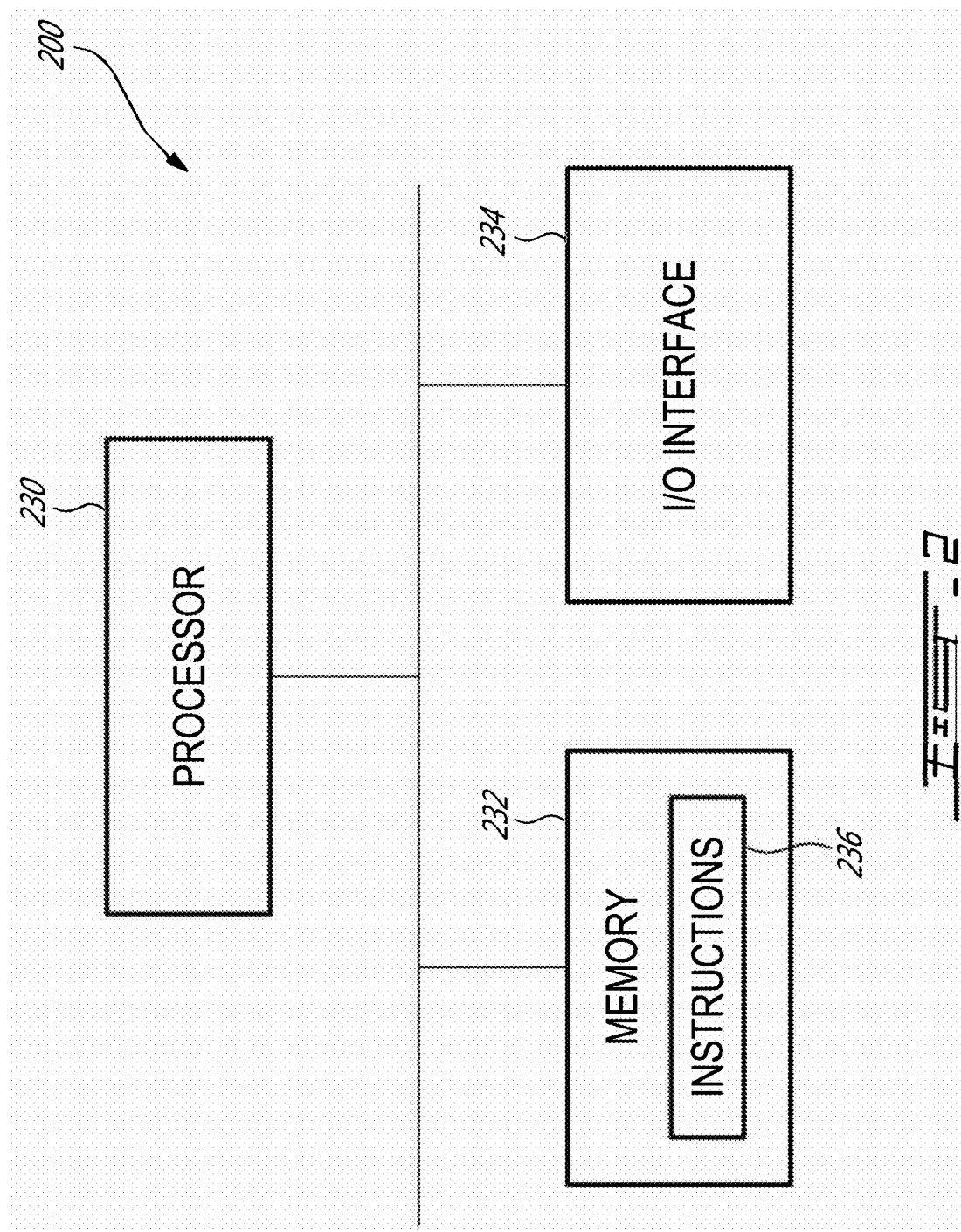

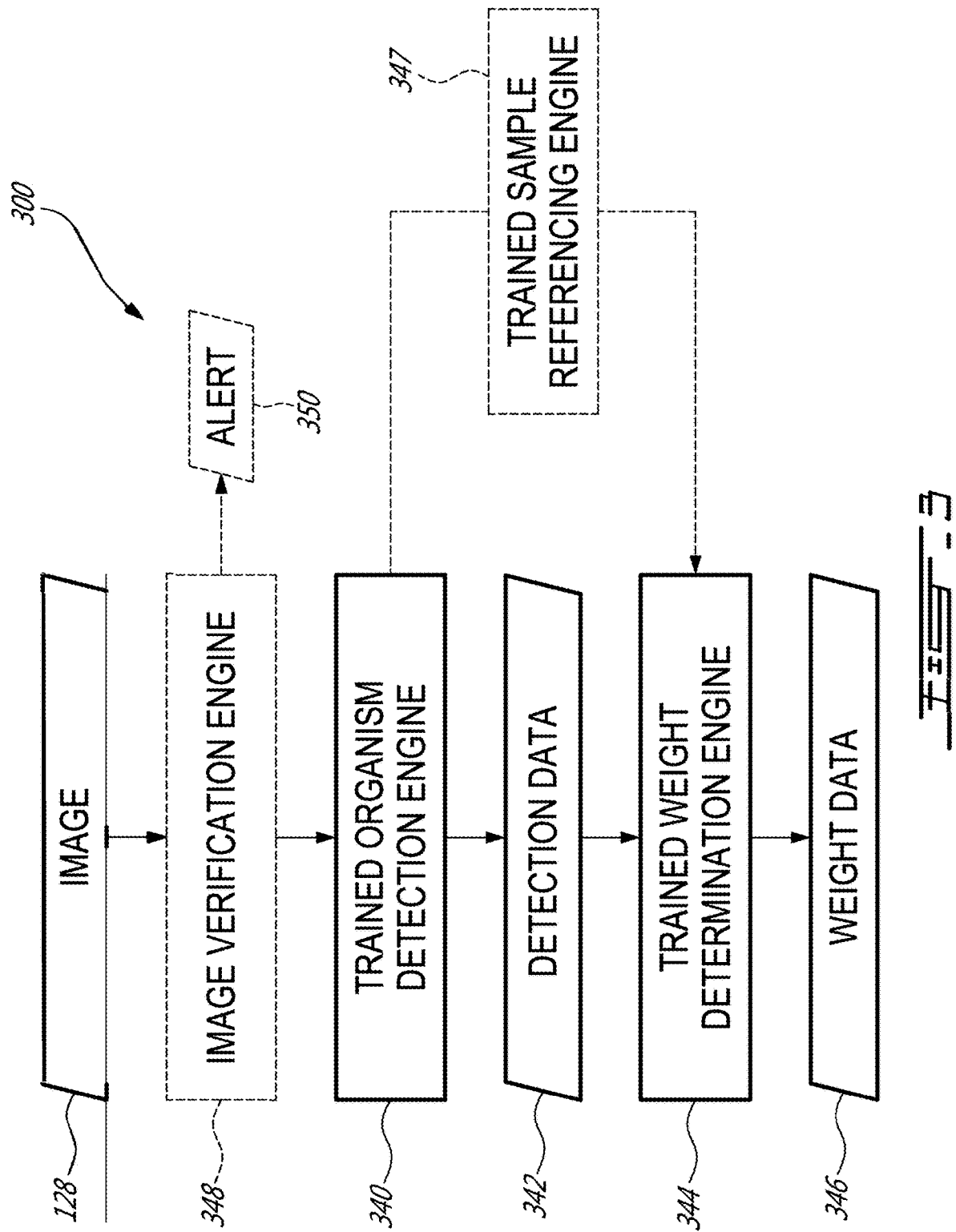

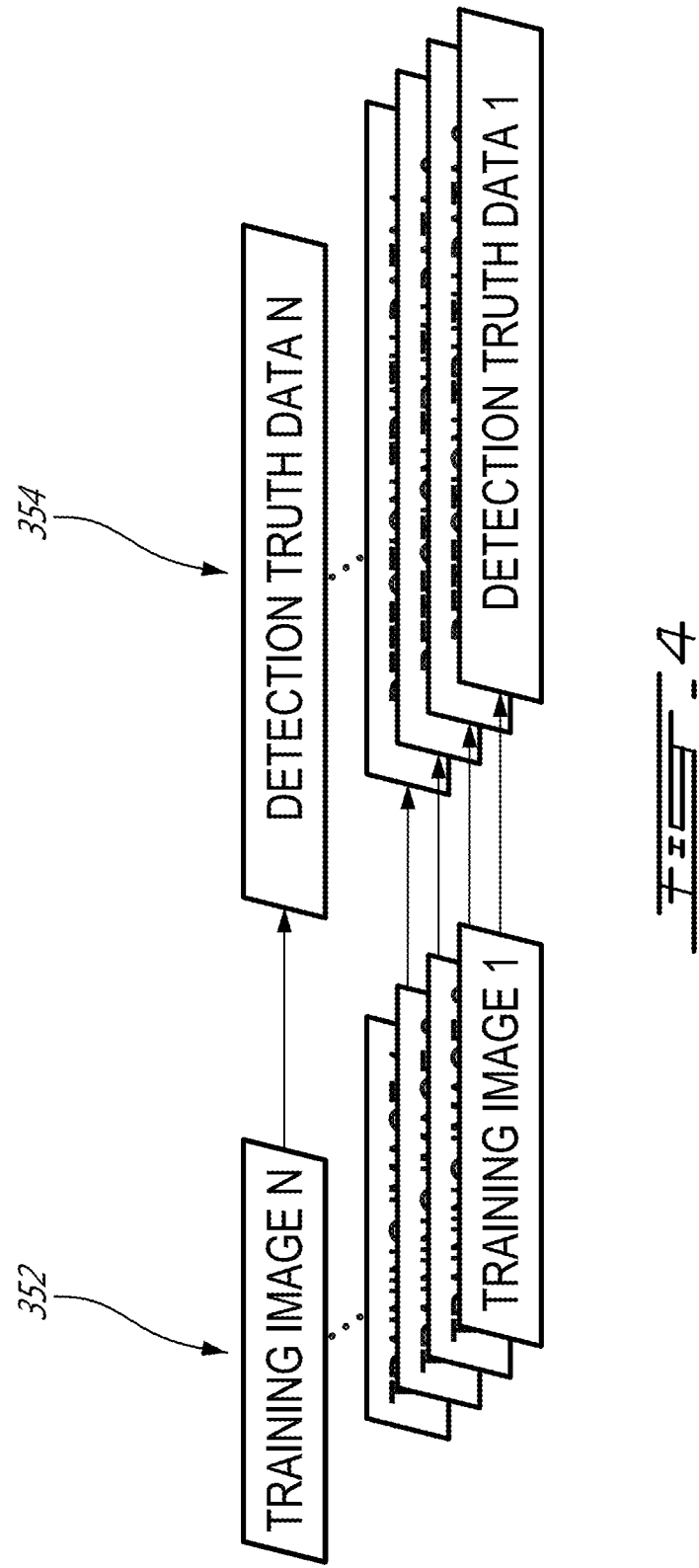

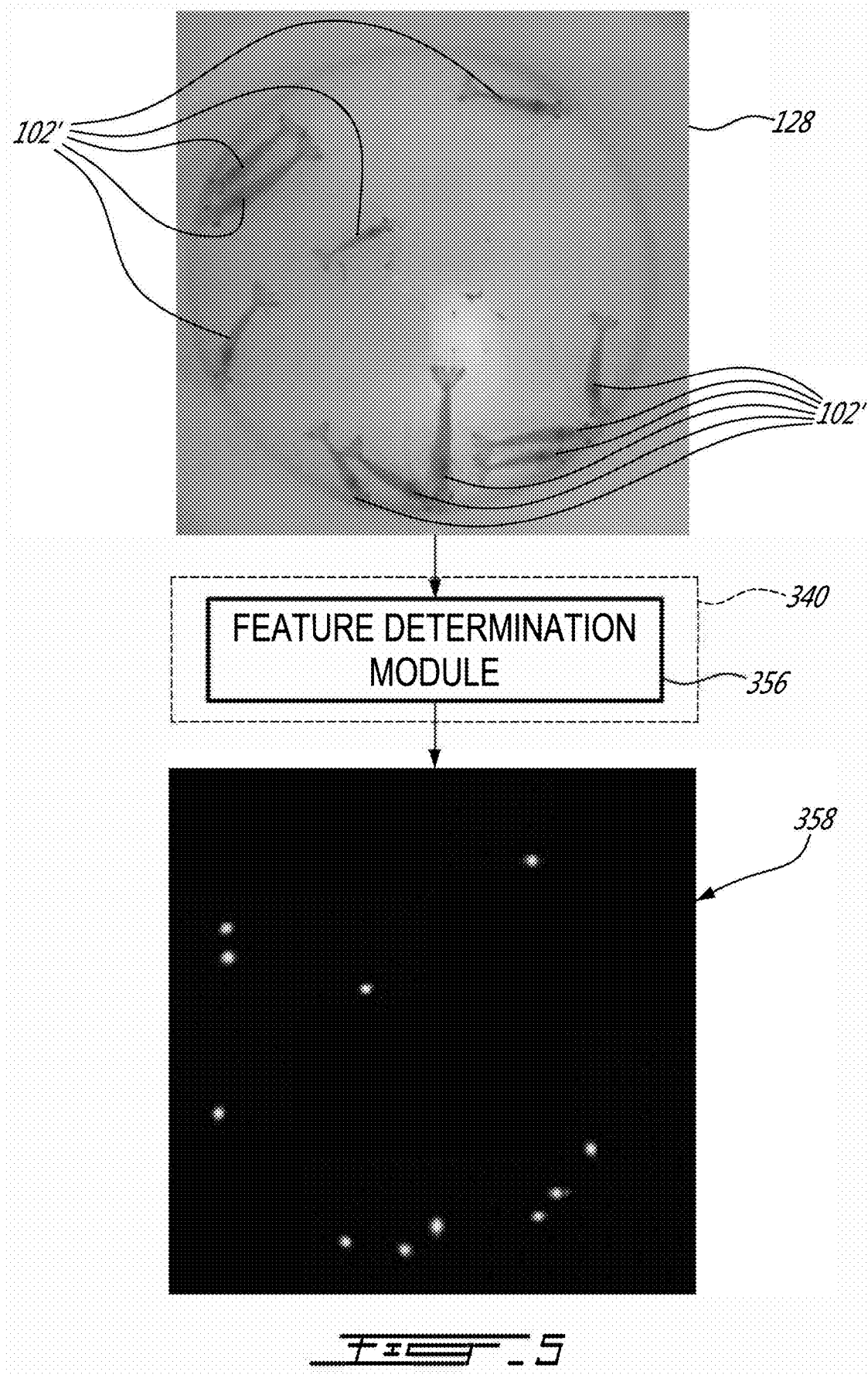

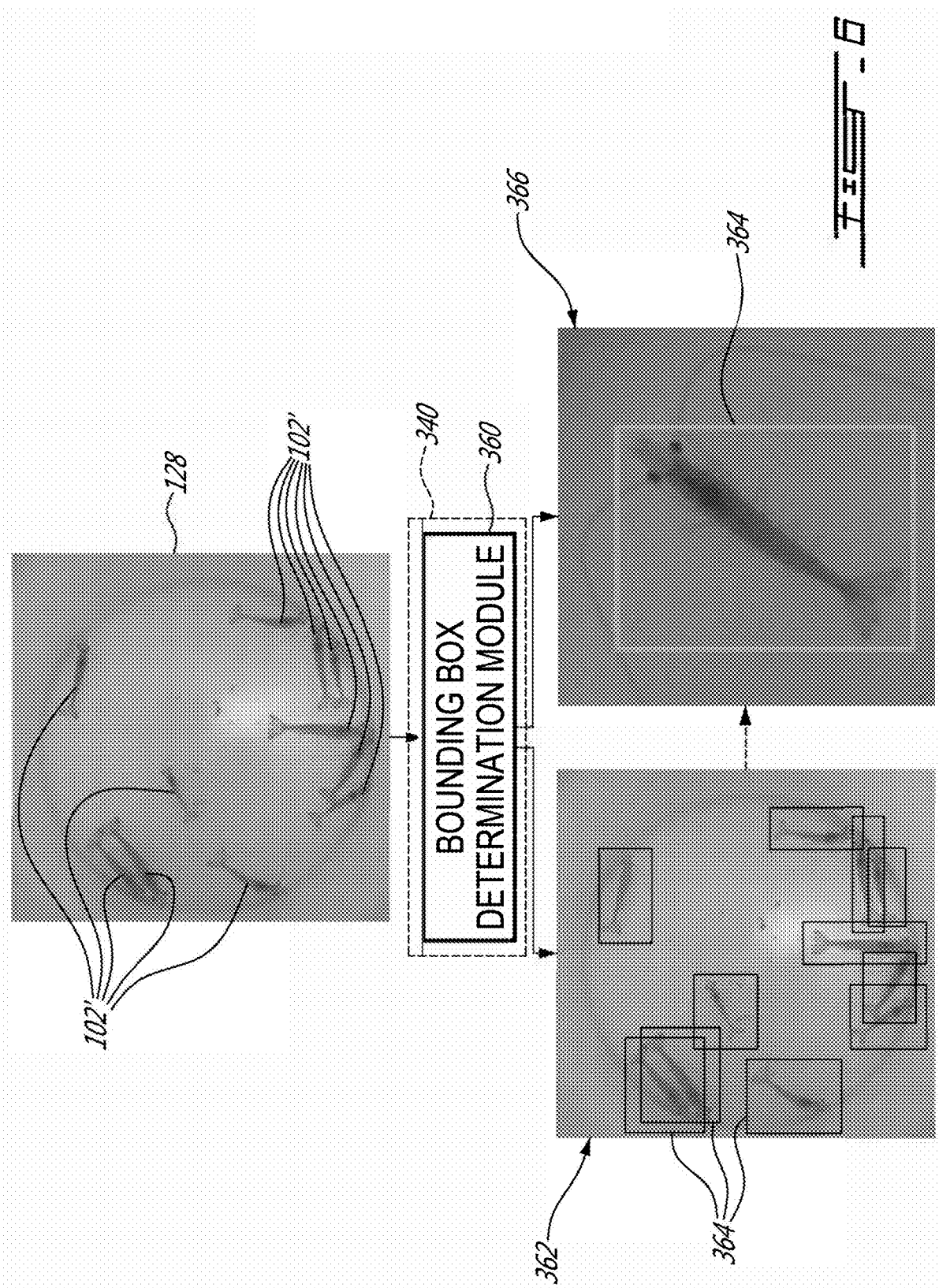

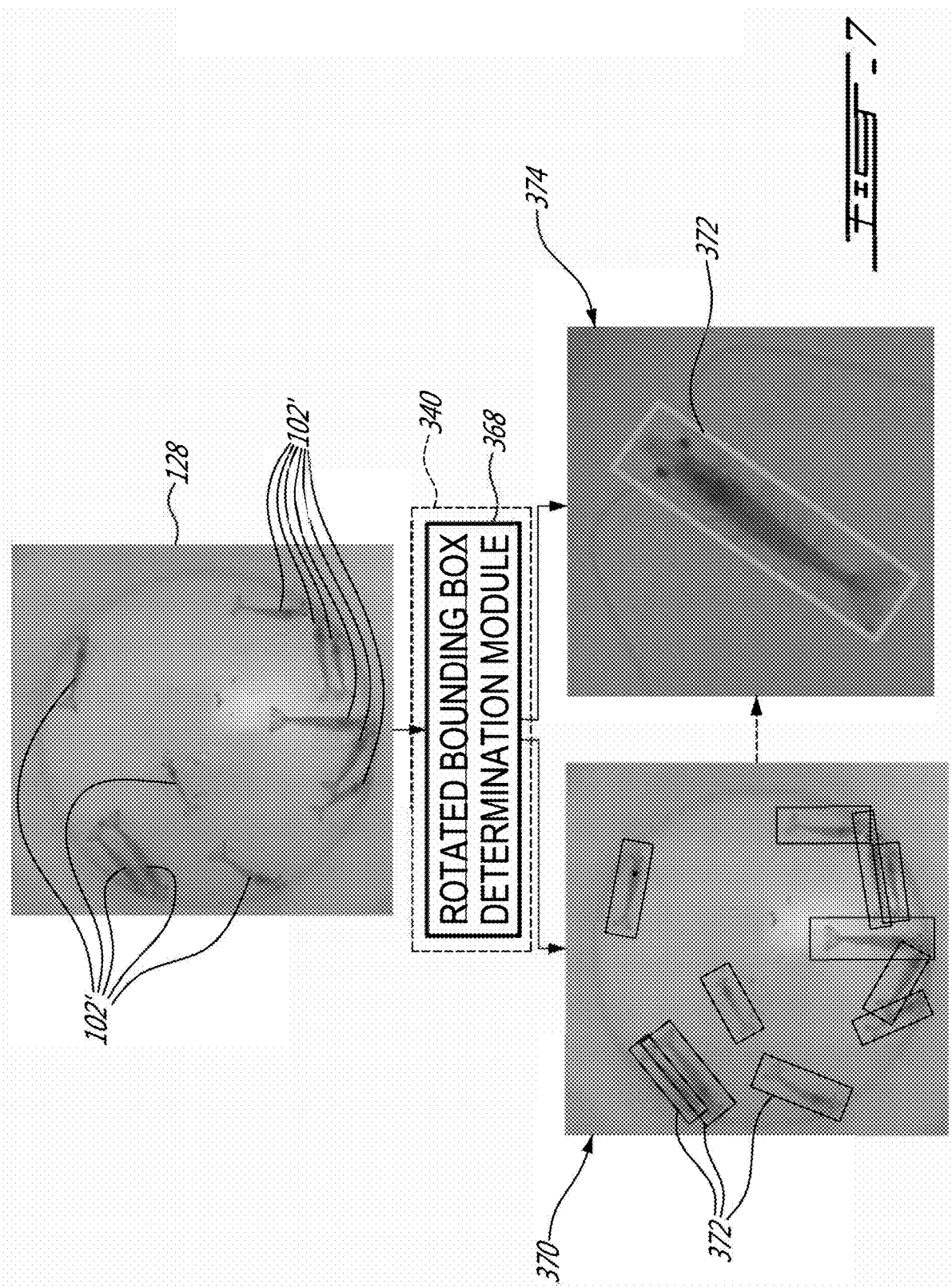

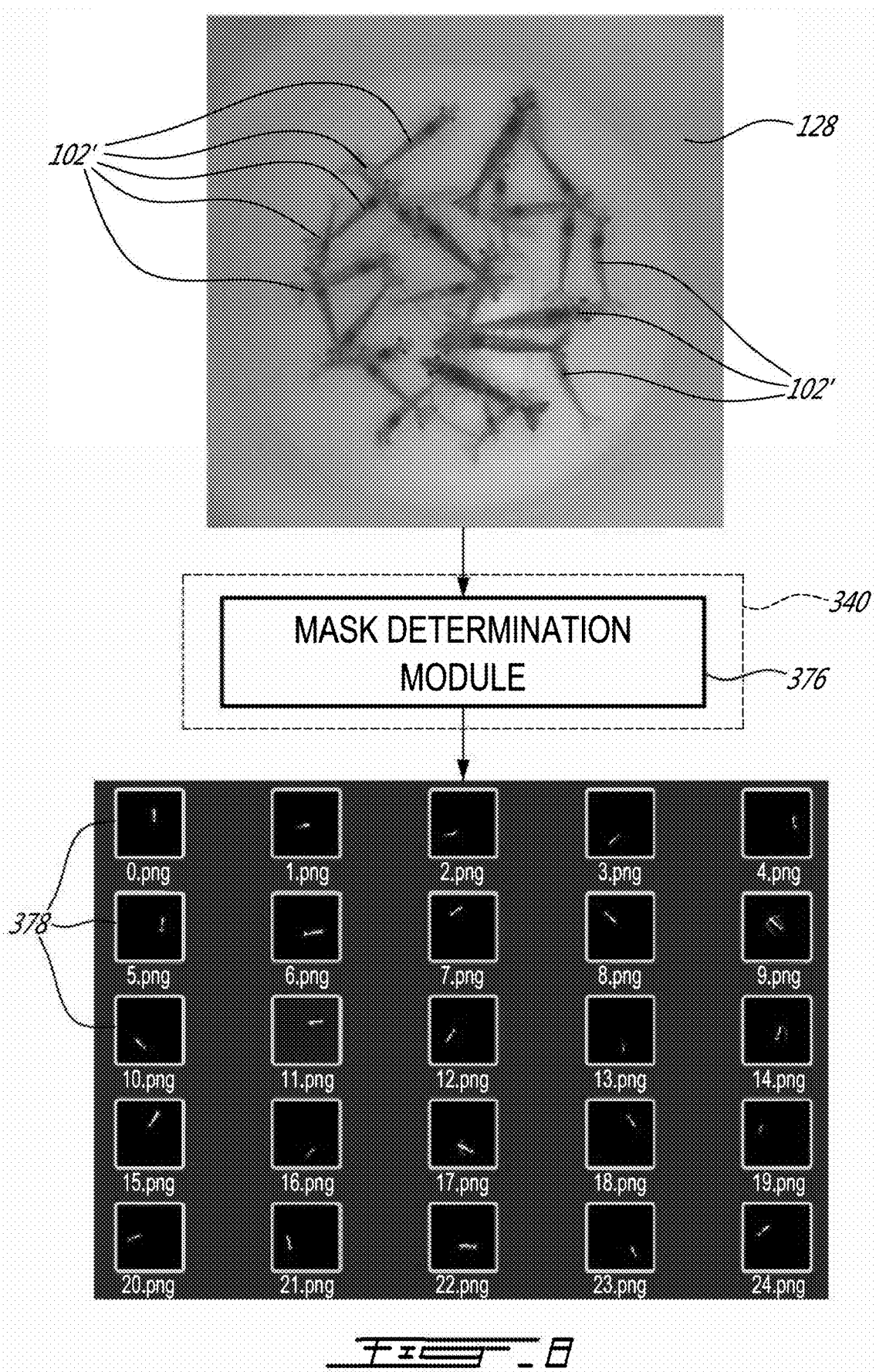

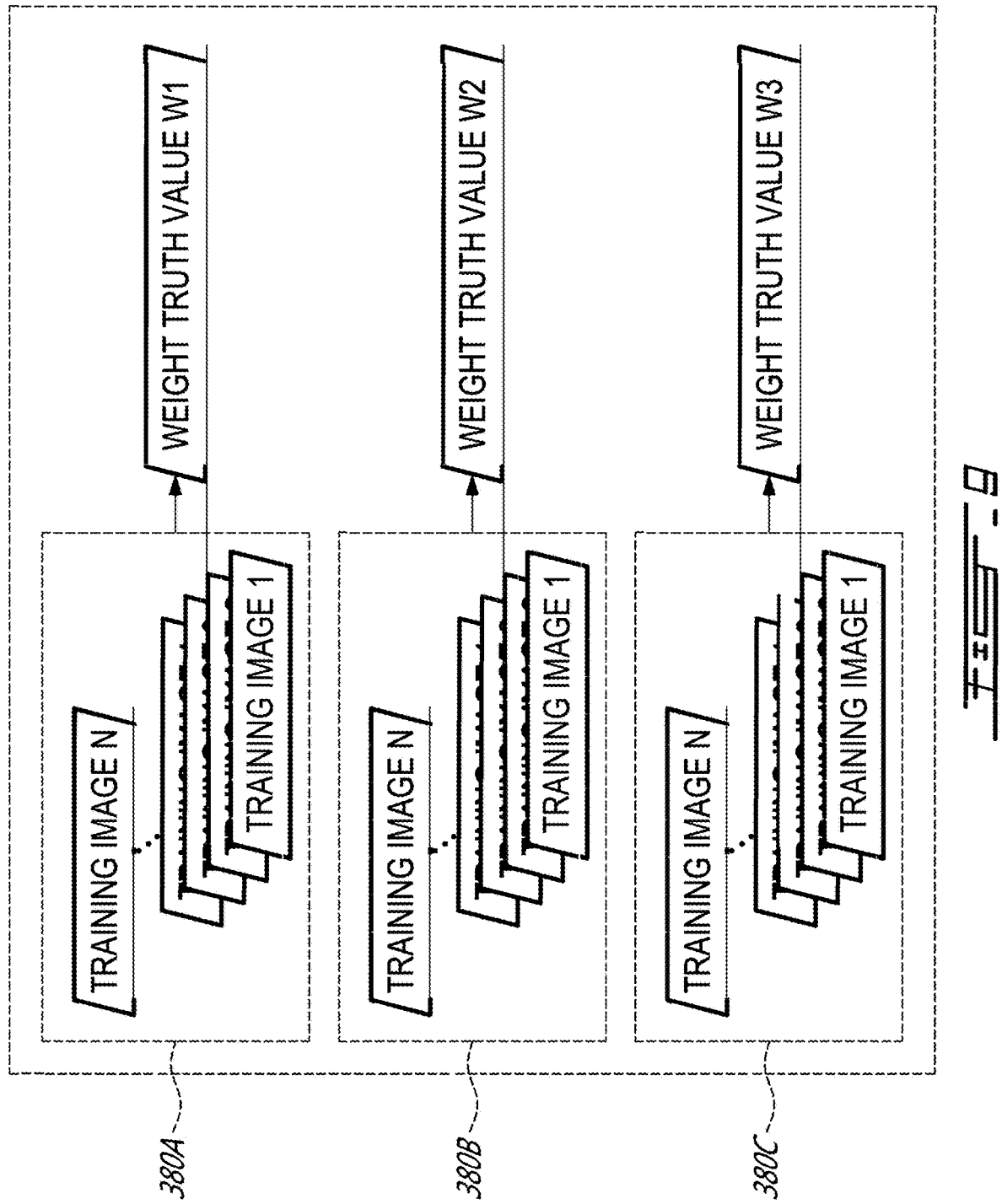

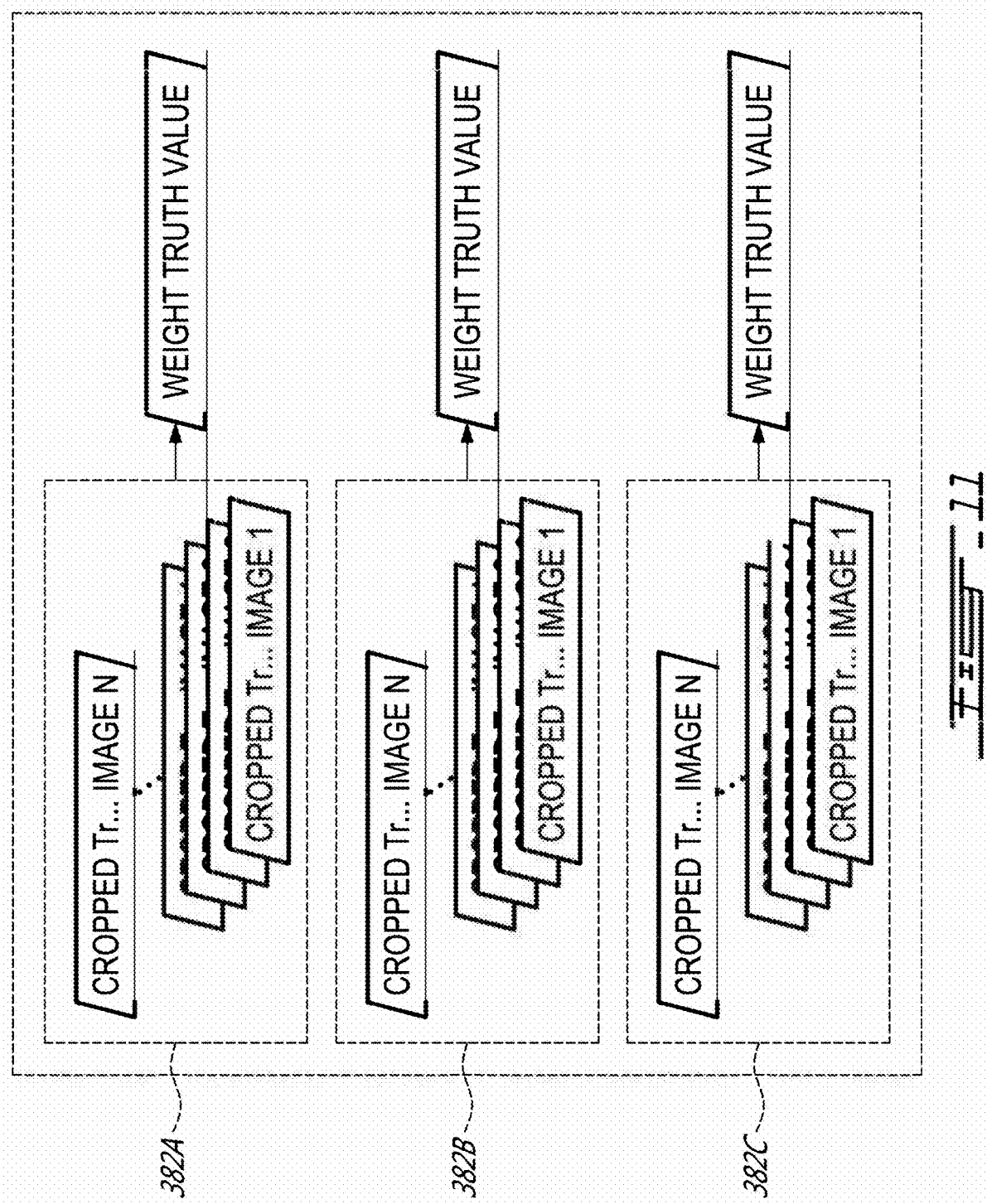

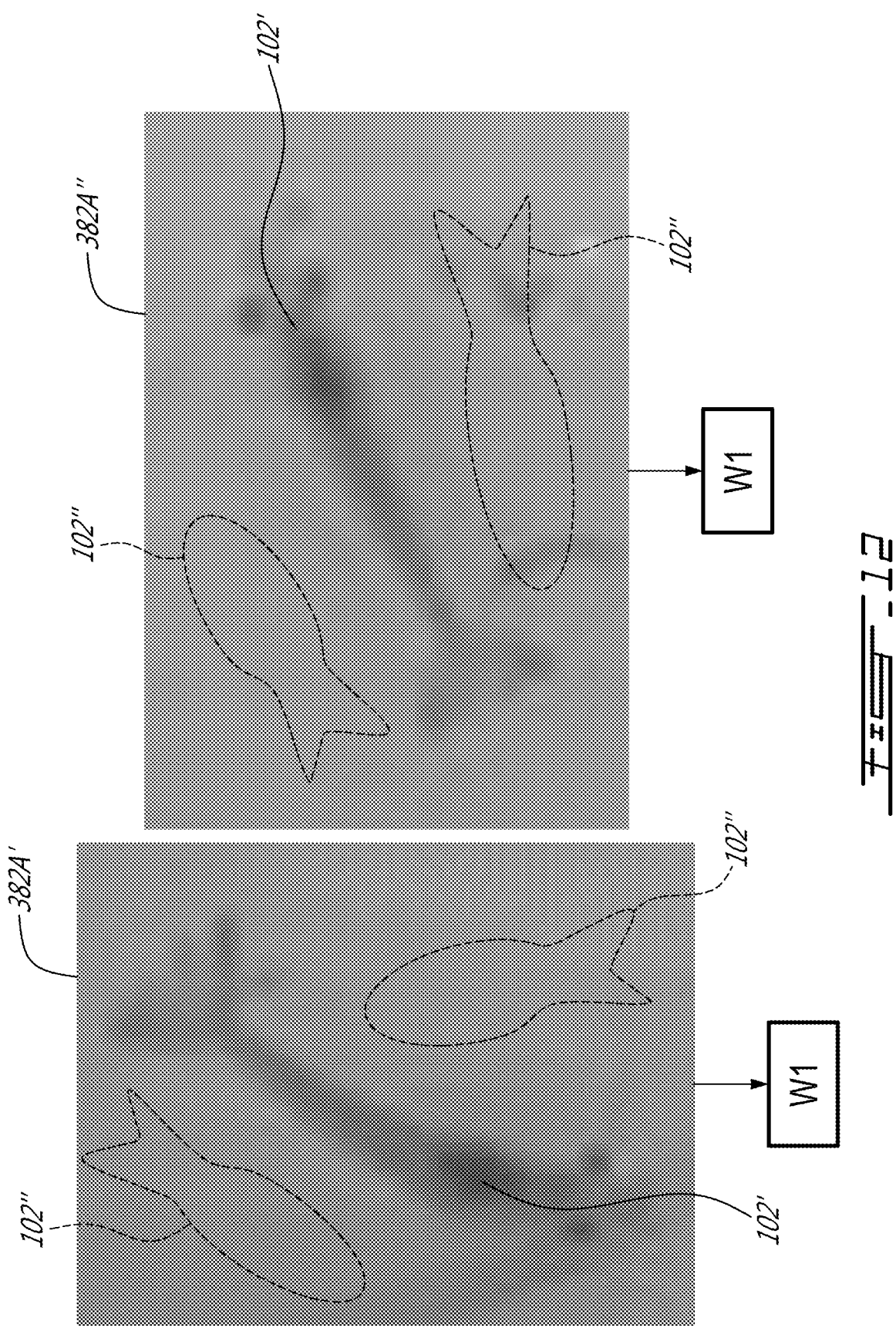

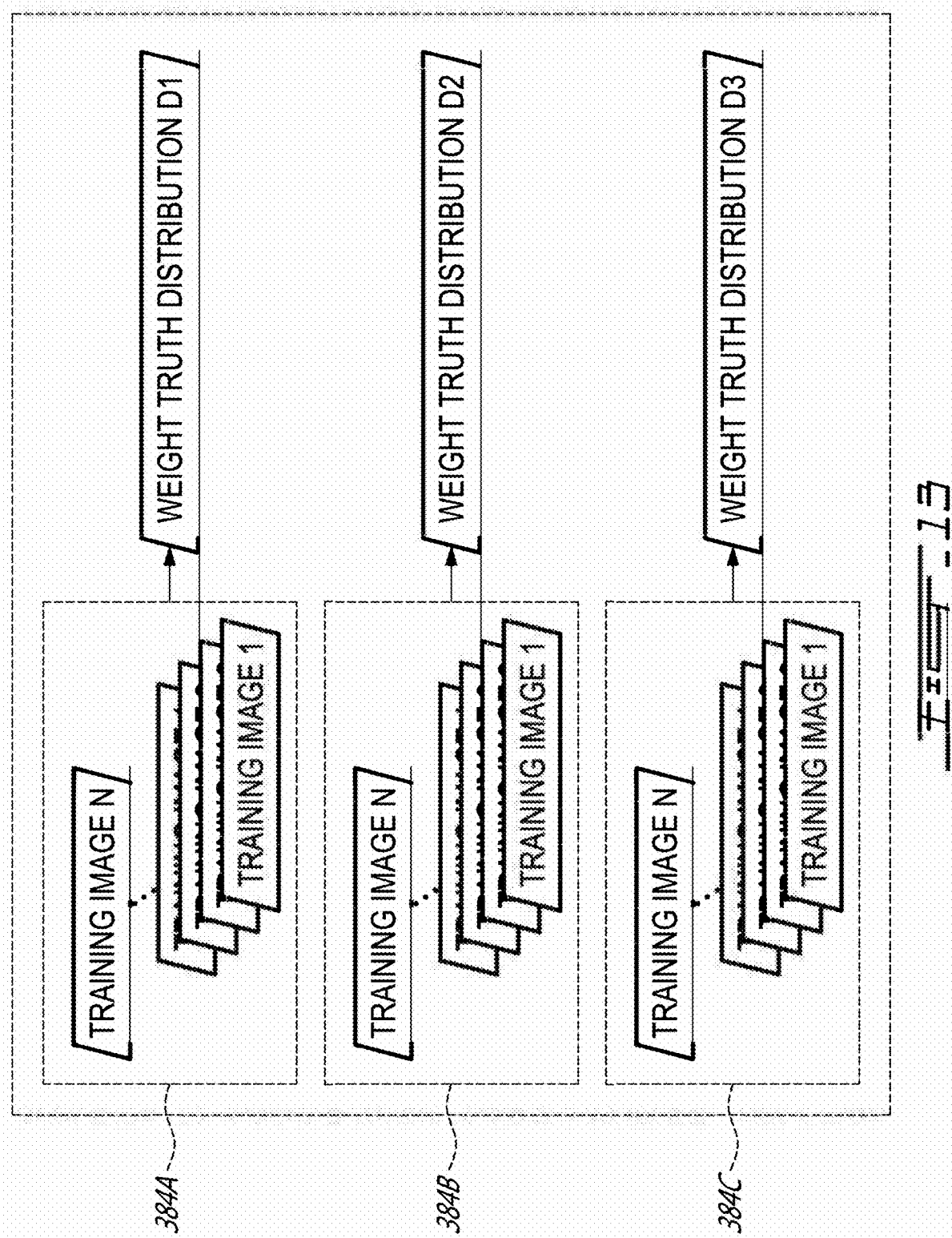

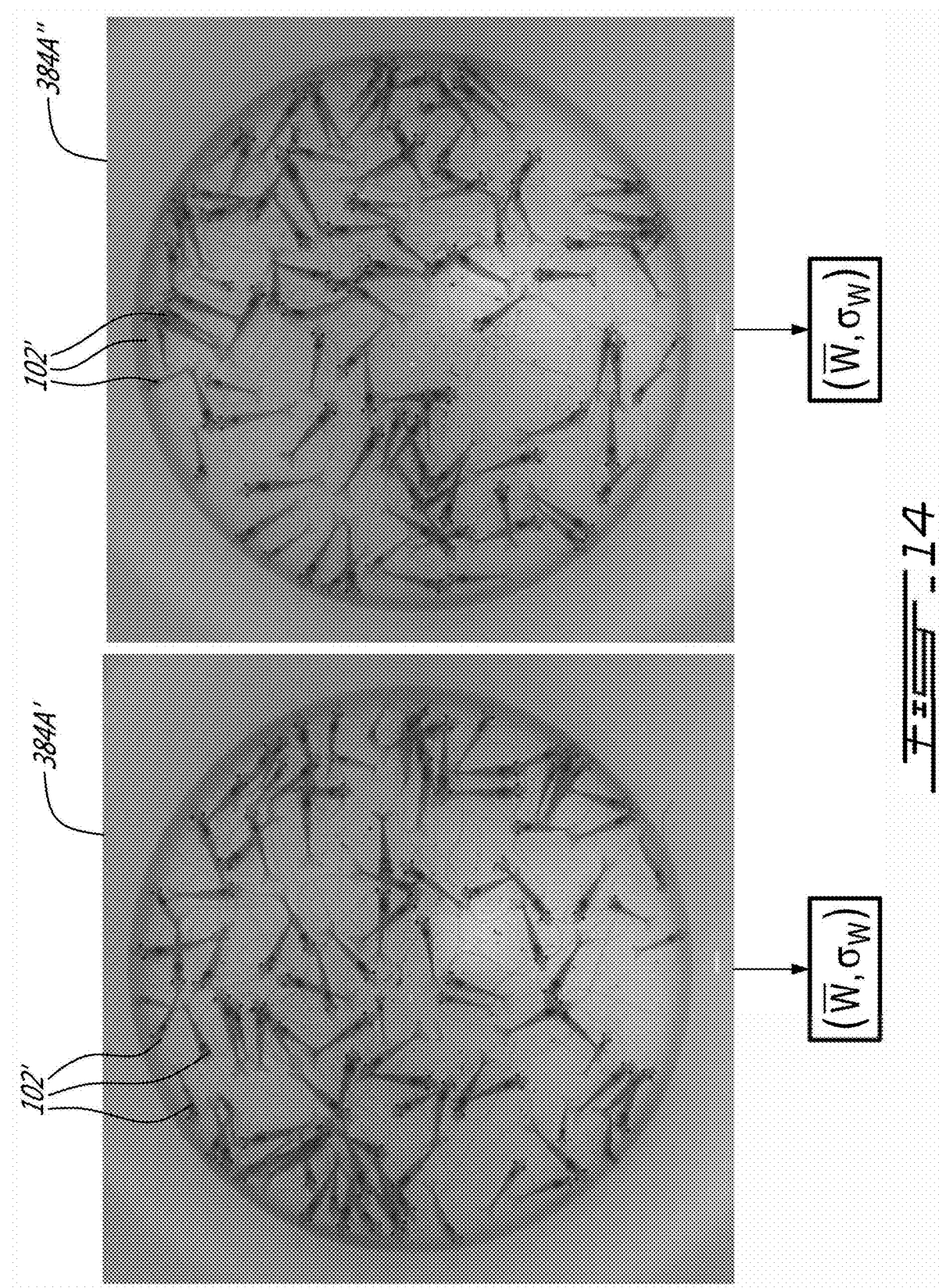

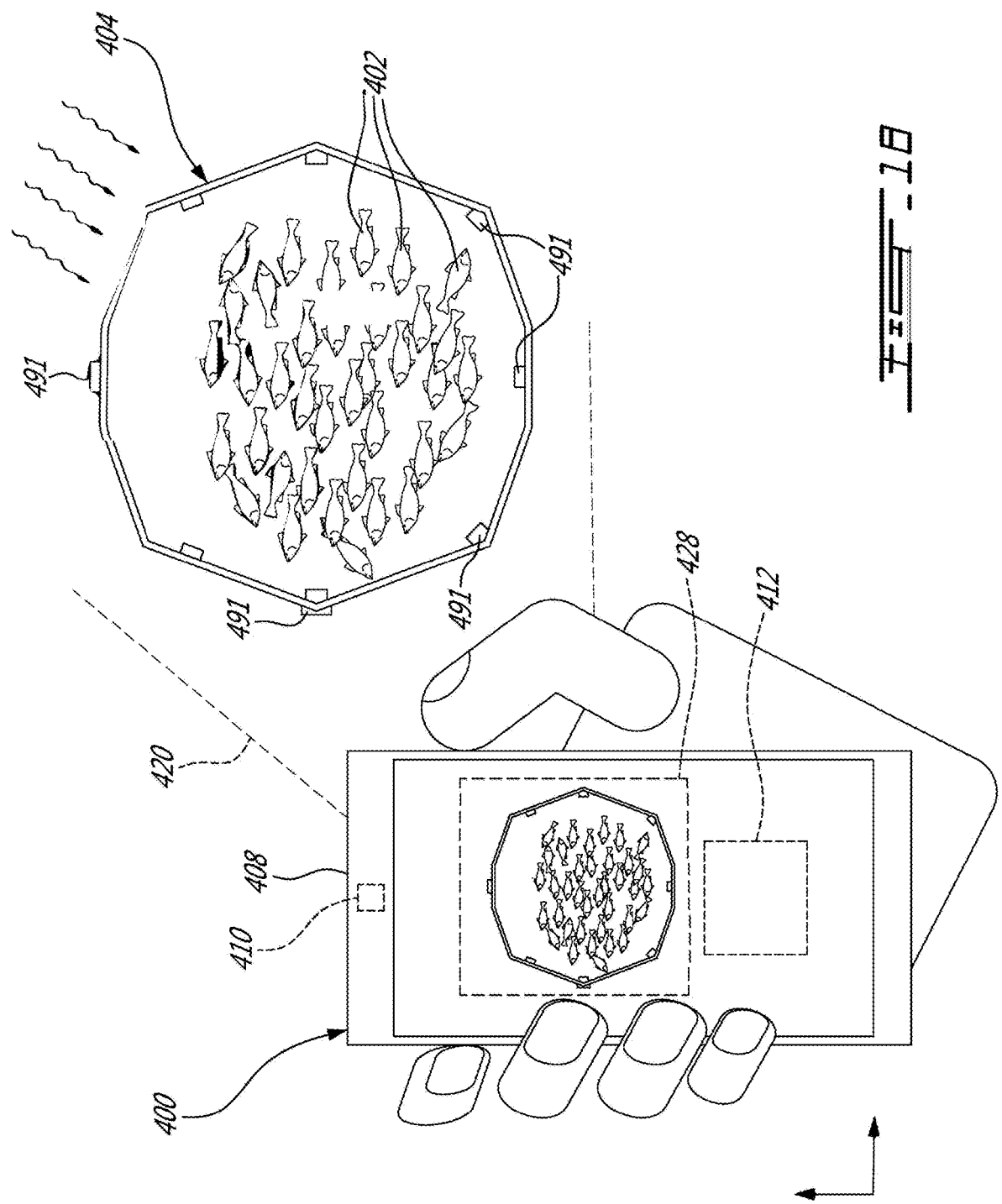

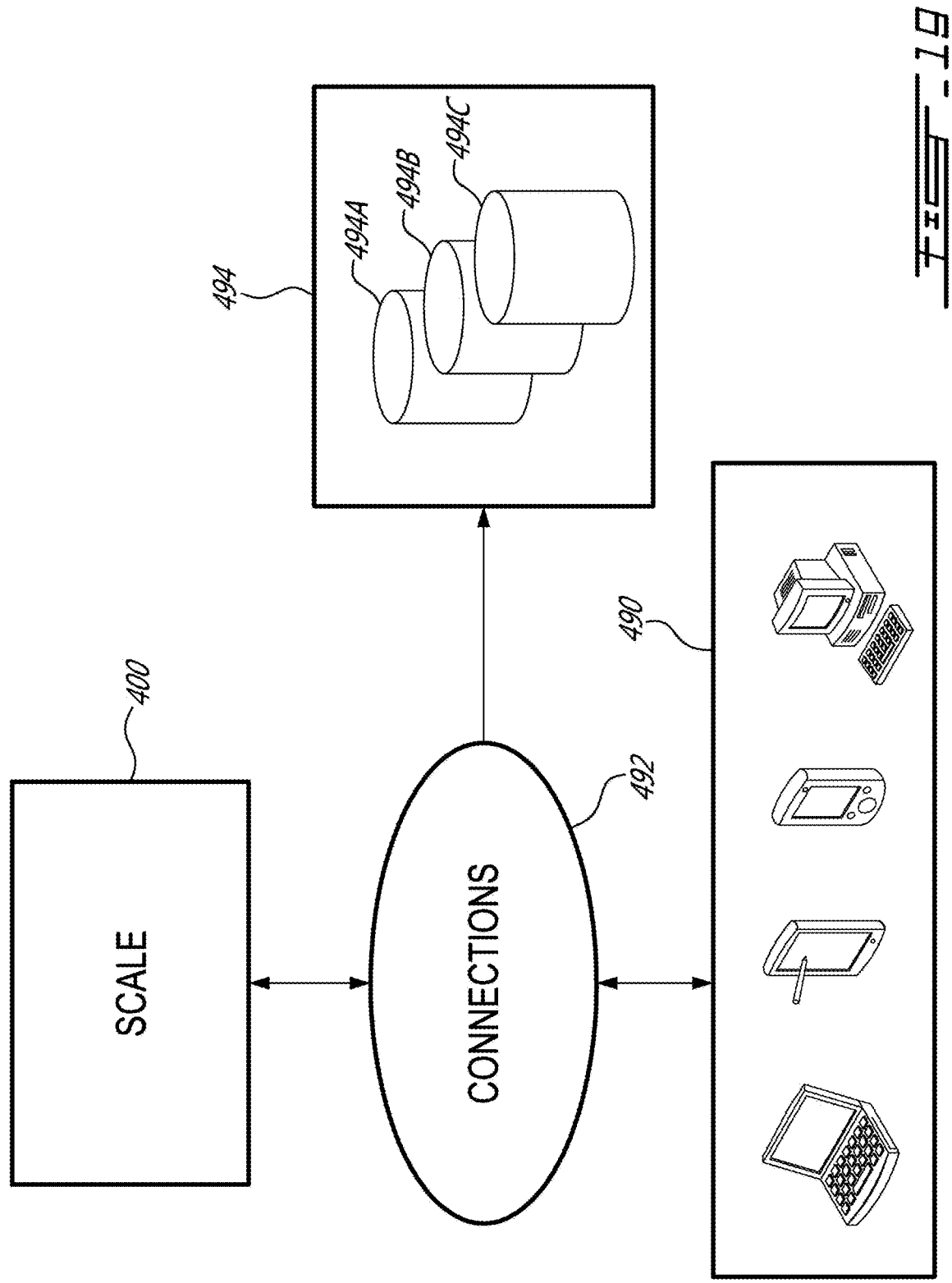

SCALE FOR DETERMINING THE WEIGHT OF SHRIMPS

FIELD

The improvements generally relate to systems and methods for determining a value of a variable of interest concerning one or more aquatic organisms in a sample and more particularly relate to such systems and methods which involve computer vision and artificial intelligence in said determination.

BACKGROUND

Aquaculture involves cultivating populations of aquatic organisms (e.g., fish, shrimps, eggs, crustaceans, molluscs or aquatic plants) as they grow over time. Controlling the cultivated organisms and/or the amount of food given to the cultivated organisms (sometimes in the form of smaller aquatic organisms), can be required to achieve satisfactory efficiency in terms of growth, survival rate and costs.

Published PCT application WO 2012/083461 describes methods and systems for estimating a relatively large quantity of organisms in a sample using the quantity of attenuation, by the sample, of a light signal. Published PCT application WO 2016/004527 describes methods and systems for estimating a relatively large quantity of organisms in a sample by acquiring, from a camera, an image of the sample contained in a container and by determining using a computer the quantity of organisms based on the previously acquired image.

Although existing methods and systems were satisfactory to a certain degree, there still remains room for improvement.

SUMMARY

In an aspect, there is described a scale for determining weight of one or more organisms contained in a sample. The scale has a camera with a field of view orientable towards the sample and which is configured for acquiring an image of the one or more organisms of the sample. The scale has a controller with a memory and a processor configured to access the acquired image. Once the image has been accessed, the controller is configured to, using an organism detection engine being stored on the memory and being trained, detect one or more organism representations in one or more corresponding portions of the accessed image and to generate detection data concerning the one or more detected organism representations. The controller is also configured to, using an organism weight determination engine being stored on the memory and being trained, determine weight data concerning weight associated to the one or more detected organism representations based on the detection data. In some embodiments, the engines are trained using supervised learning whereas in other embodiments, the engines are trained using unsupervised learning. As can be understood, involving such machine learning engines can provide advantages over the prior art. For instance, in some embodiments, the accuracy and/or speed at which the weight data are determined using the previously trained engines can be advantageous over the existing systems and methods. Also, in these embodiments, such machine learning engines can continuously access and learn from data so as to enable the controller to access hidden features in the acquired image.

In accordance with one aspect, there is provided a scale for determining weight of one or more organisms contained in a sample, the scale comprising: a camera having a field of view orientable towards the sample and being configured for acquiring an image of the one or more organisms of the sample; a controller having a memory and a processor configured to perform the steps of: accessing the acquired image; using an organism detection engine being stored on the memory and being trained, detecting one or more organism representations in one or more corresponding portions of the accessed image and generating detection data concerning the one or more detected organism representations; and using an organism weight determination engine being stored on the memory and being trained, determining weight data concerning weight associated to the one or more detected organism representations based on the detection data.

In accordance with another aspect, there is provided a computer-implemented method for determining weight of one or more organisms contained in a sample, the method comprising: using a controller having a memory and a processor, receiving an image of the one or more organisms of the sample; accessing the acquired image; using an organism detection engine being stored on the memory and being trained, detecting one or more organism representations in one or more corresponding portions of the accessed image and generating detection data concerning the one or more detected organism representations; and using an organism weight determination engine being stored on the memory and being trained, determining weight data concerning weight associated to the one or more detected organism representations based on the detection data.

In accordance with another aspect, there is provided a system for determining a variable of interest associated to one or more organisms contained in a sample, the system comprising: a camera having a field of view orientable towards the sample and being configured for acquiring an image of the one or more organisms of the sample; a controller having a memory and a processor configured to perform the steps of: accessing the acquired image; using an organism detection engine being stored on the memory and being trained, detecting one or more organism representations in one or more corresponding portions of the accessed image and generating detection data concerning the one or more detected organism representations; and using a variable determination engine being stored on the memory and being trained, determining data concerning a variable of interest associated to the one or more detected organism representations based on the detection data. In some embodiments, the variable(s) of interest that can be determined by the system can include, but not limited to, a weight, a size, a length, a quantity, an estimated unitary volume, a biomass, an appearance-related variable of interest such as a color, pigmentation and the like, a presence of one or more diseases, a depth, a position, a volume, a width, an area and any other variables of interest pertaining to the field of aquaculture.

In accordance with another aspect, there is provided a computer-implemented method for determining a variable of interest associated to one or more organisms contained in a sample, the method comprising: using a controller having a memory and a processor, receiving an image of the one or more organisms of the sample; accessing the acquired image; using an organism detection engine being stored on the memory and being trained, detecting one or more organism representations in one or more corresponding portions of the accessed image and generating detection data concerning the one or more detected organism representations; and using a variable determination engine being stored on the memory and being trained, determining data concerning a variable of interest associated to the one or more detected organism representations based on the detection data. In some embodiments, the variable of interest can be a weight, a size, a length, a quantity, an estimated unitary volume, a biomass, an appearance-related variable of interest such as a color, pigmentation and the like, a presence of one or more diseases, a depth, a position, a volume, a width, an area and any other variables of interest pertaining to the field of aquaculture.

It will be understood that the expression "computer" as used herein is not to be interpreted in a limiting manner. It is rather used in a broad sense to generally refer to the combination of some form of one or more processing units and some form of memory system accessible by the processing unit(s). Similarly, the expression "controller" as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 1A is a cross-sectional, transversal view taken along a longitudinal axis of an example of a scale for determining weight of organisms of a sample, integrated to a lid of a bucket, in accordance with an embodiment;

FIG. 1B is a cross-sectional, top view taken along section 1B-1B of the scale shown in FIG. 1A, in accordance with an embodiment;

FIG. 1C is an example of an image acquired by the scale shown in FIG. 1A, in accordance with an embodiment;

FIG. 2 is a schematic view of an example of a computing device of a controller of the scale of FIG. 1, in accordance with an embodiment;

FIG. 3 is a schematic view of an example of a software application of a controller of the scale of FIG. 1, showing a trained organism detection engine and a trained organism weight determination engine, in accordance with an embodiment;

FIG. 4 is a schematic view of exemplary training images and associated detection truth data, in accordance with an embodiment;

FIG. 5 is a schematic view of an example of the trained organism detection engine of FIG. 3, with a feature determination module, in accordance with an embodiment;

FIG. 6 is a schematic view of an example of the trained organism detection engine of FIG. 3, with a bounding box determination module, in accordance with an embodiment;

FIG. 7 is a schematic view of an example of the trained organism detection engine of FIG. 3, with a rotated bounding box determination module, in accordance with an embodiment;

FIG. 8 is a schematic view of an example of the trained organism detection engine of FIG. 3, with a mask determination module, in accordance with an embodiment;

FIG. 9 is a schematic view of exemplary training images and associated weight truth values, in accordance with an embodiment;

FIG. 11 is a schematic view of exemplary cropped training images and associated weight truth value, in accordance with an embodiment;

FIG. 12 includes examples of the cropped training images and associated weight truth values of FIG. 11;

FIG. 13 is a schematic view of exemplary training images and associated weight truth distribution, in accordance with an embodiment;

FIG. 14 includes examples of the training images and associated weight truth values of FIG. 13;

FIG. 18 is a schematic view of another example of a scale for determining weight of organisms of a sample, integrated to a mobile electronic device, in accordance with an embodiment; and FIG. 19 is a diagram illustrating an exemplary system involving the scale of FIG. 18, in accordance with an embodiment.

DETAILED DESCRIPTION

Figure 10:
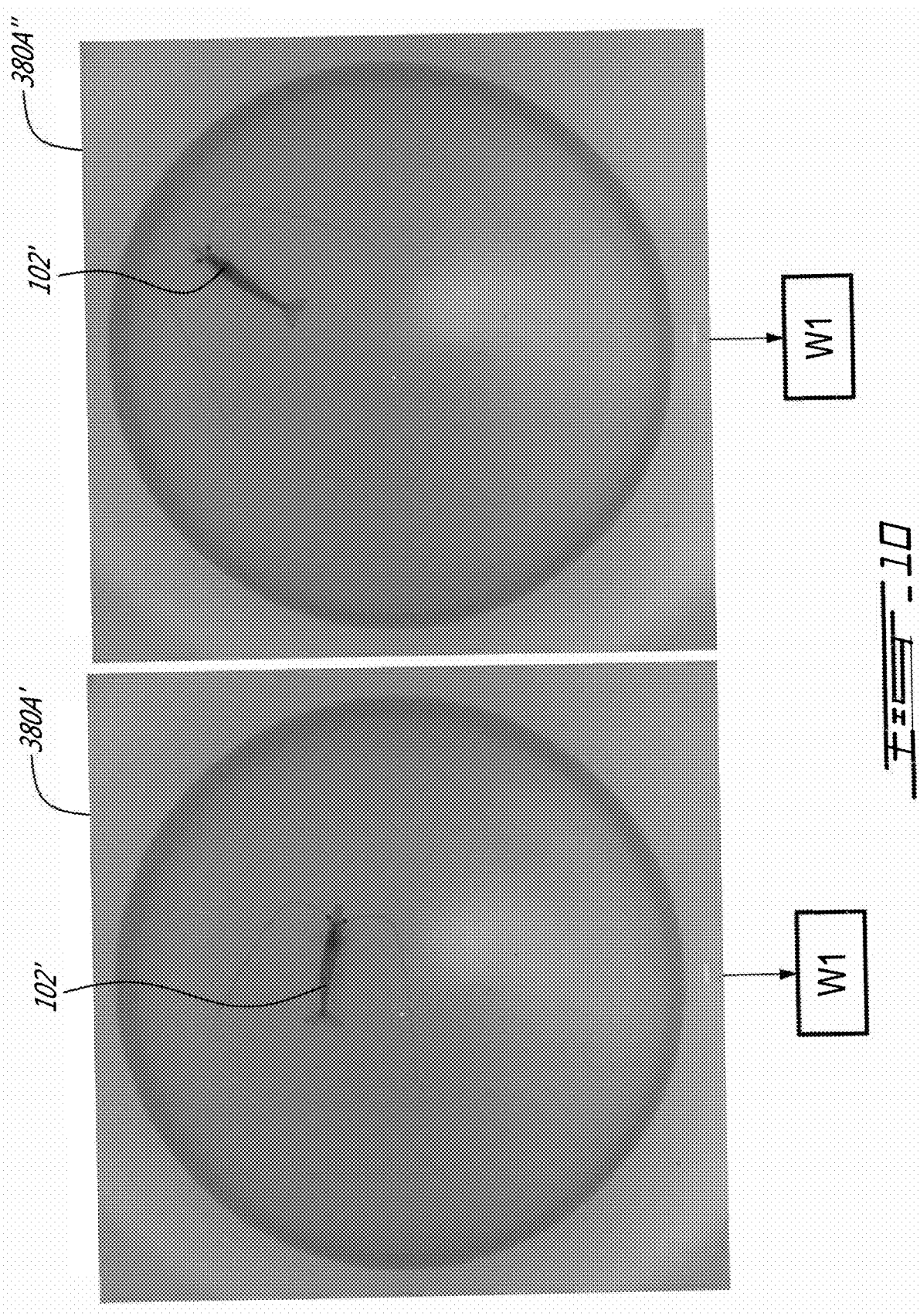
FIG. 10 includes examples of the training images and associated weight truth values of FIG. 9.

This disclosure describes a scale for determining weight of organisms contained in a sample. In some embodiments, the scale can be used to determine a weight value which is indicative of a weight of one organism contained in the sample. In some other embodiments, the scale can be used to determine individual weight values which are indicative of the weight of individual ones of a plurality of organisms contained in the sample. In alternate embodiments, the scale can be used to determine a weight distribution which is indicative of a weight distribution of a plurality of organisms contained in the sample. In further embodiments, the scale can be used to determine a total weight value which is indicative of a weight of a totality of a plurality of organisms contained in the sample, and the like. The organisms can include marine organisms such as shrimps, fish, eggs, crustaceans, molluscs, plankton, aquatic plants and/or algae, and can include insects in some specific embodiments. As will be understood, although specific embodiments are described, embodiments which are best suited for determining weight associated with given organisms will be apparent for the skilled reader. Accordingly, the sample can include one or more organisms in a liquid medium in some embodiments whereas the sample can include only the one or more organisms in some other embodiments, lacking any liquid medium.

FIGS. 1A-B show an example of a scale 100 for determining weight of one or more organisms 102 contained in a sample 104, in accordance with an embodiment.

In this specific example, the scale 100 has a container 106, a structure 108 mountable to the container 106 and one (or more) camera(s) 110 mounted to the structure 108 in wired or wireless communication with a controller 112. In the illustrated example, the container 106 can be referred to as a closed container due to its closed bottom 114 from which is extending a contour wall 116.

More specifically, in this embodiment, the structure 108 is used to maintain the camera 110 at a given distance d from the closed bottom 114 of the container 106. As illustrated in FIG. 1A, the structure 108 is provided in the form of a lid 109, which is removably connected to an upper end 118 of the contour wall 116, opposite the closed bottom 114.

In this embodiment, the container 106 and the structure 108 are made light hermetic to prevent light from entering the container 106 to avoid undesirable interference between ambient light and the scale 100, for instance.

Moreover, still in this specific embodiment, an inner face 115 of the closed bottom 114 and an inner face 117 of the contour wall 116 are light reflective. In this way, a light emitting device 111 of the scale 100 can be adapted to provide satisfactory lighting conditions during image acquisition by the camera 110.

As shown, in this example, the camera 110 is positioned so that, when the container 106 receives the sample 104 of organisms 102, the camera 110 can image the sample 102, or a portion thereof, for further analysis by the controller 112.

In other words, the camera 110 has a field of view 120 which is oriented towards the sample 104. As depicted, the field of view 120 of the scale 100 shown in FIG. 1A encompasses an entirety of a top surface 122 of the sample 102 as well as a portion 124 of the contour wall 116, as better seen in an image 128 acquired by the camera 110 such as shown in FIG. 1C. In alternate embodiments, the field of view 120 can be limited to a given portion of the sample 104.

As will be described in greater detail below, once the image 128 is acquired by the camera 110, the controller 112 is configured to detect one or more organism representations 102' in one or more corresponding portions of the accessed image 128, using a previously trained organism detection engine. Once the one or more organism representations 102' are detected in the accessed image 128, the organism detection engine is configured to generate detection data concerning the one or more detected organism representations 102'. The controller 112 is further configured to determine, based on the previously generated detection data, weight data concerning weight associated to the one or more detected organism representations 102' using a previously trained organism weight determination engine. In this specific embodiment, the scale 100 includes a visual indicator 121 which can be operable to display the weight data upon determination by the controller 112.

In some embodiments, it was found preferably to provide the scale 100 with only one camera 110, as having only one camera 110, such as in the illustrated embodiment, can reduce the weight and the cost of the scale 100. Moreover, having only one camera 110 may reduce the computational requirements generally imparted on the controller 112 compared to when using more than a plurality of cameras 110 such as in stereo-imaging systems, for instance.

The controller 112 can be provided as a combination of hardware and software components. The hardware components can be implemented in the form of a computing device 200, an example of which is described with reference to FIG. 2. Moreover, the software components of the controller 112 can be implemented in the form of a software application 300, an example of which is described with reference to FIG. 3.

More specifically, and referring now to FIG. 2, the computing device 200 can have a processor 230, a memory 232, and I/O interface 234. Instructions 236 for determining weight of the one or more organism representations 102' shown in an image can be stored on the memory 232 and accessible by the processor 230.

The processor 230 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 232 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 234 enables the computing device 200 to interconnect with one or more input devices, such as the camera 110, or with one or more output devices such as the visual indicator 121.

Each I/O interface 234 enables the controller 112 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WIMAX), SS7 signaling network, fixed line, local area network, wide area network, and others, including any combination of these.

As can be understood, the processor 230, the memory 232, and other components of the scale 100 requiring electrical power can be powered using a power supply. In one embodiment, the power supply is a standalone power supply, such as a battery or a solar panel, to offer greater mobility to the scale 100 than by the use of a power cord, for instance.

Referring now to FIG. 3, the software application 300 is stored on the memory 232 and accessible by the processor 230 of the computing device 200. As can be understood, the software application 300 can be executed by the controller 112 and is described with reference to the scale 100 of FIG. 1A for ease of reading.

As shown, the software application 300 is configured to access the image 128, which shows one or more organism representations 102'. For instance, the image 128 can be accessed directly from the camera 110, and alternately or additionally, be accessed from the memory 232 where the image 128 has been previously stored after its acquisition by the camera 110.

As depicted, the software application 300 includes a previously trained organism detection engine 340 and a previously trained weight determination engine 344, both of which are stored on the memory 232 and executable by the processor 230 in this example.

It is intended that the organism detection engine 340 and the weight determination engine 344 (collectively referred to as the trained engines 340 and 344) can be trained using supervised learning during which the trained engines 340 and 344 are presented with example inputs such as training images and their corresponding desired (or truth) outputs.

More specifically, the software application 300 is configured to perform the steps of, using the organism detection engine 340, detecting one or more organism representations 102' in one or more corresponding portions of the accessed image 128 and generating detection data 330 concerning the one or more detected organism representations 102'.

Depending on the embodiment, the detection data 330 can include one or more annotated images showing the position of the detected organism representations 102', one or more cropped images each showing a respective one of the detected organism representations 102', coordinates of the detection organism representations 102', a combination thereof, or any other suitable information concerning the detected organism representations 102' in the image 128.

The software application 300 is further configured to perform the steps of, using the organism weight determination engine 344, determining weight data 346 concerning weight associated to the one or more detected organism representations 102' based on the image 128 and on the previously determined detection data 342.

For instance, in a specific embodiment the organism weight determination engine 344 can receive detection data 330 received in the form of one or more cropped images each showing a respective one of the detected organism representations 102' and then determine the weight data 346 concerning each of the organism representations 102' shown in the one or more cropped images.

As such, the weight determination which is performed by the organism weight determination engine 344 omits general approximations such as those which relate the lengths of the organism representations in the image to weight values based on some empiric mathematical formulas. Indeed, it was found that the weight values determined using these general approximations may represent a mere mean trend, which can suffer from undesirable inaccuracies. Moreover, when using such general approximations, the lengths of the organism representations in the image generally have to be measured manually by an operator using a pointer such as a computer mouse. Such identification requires to identify a point on the organism or organ representation and an opposite, point of the organism or organ representation in the image. A process which generally requires the operator to be trained to recognise the organism or organ representation in the image. Once the distance between those two points is computed, the weight values are determined using the empiric mathematical formulas. Of course, it is intended that the organism weight determination engine 344 described in this application does not require manual annotation of the accessed images 128 in order to perform the weight determination, which can be advantageous in terms of both time and resource consumption in at least some circumstances.

In some specific embodiments, the software application 300 can include an image verification engine 348 which is stored on the memory 232 and which is configured to generate an alert 350 upon determination that the accessed image 128 is unsatisfactory. For instance, the image verification engine 348 can determine that the accessed image 128 has been acquired under unsatisfactory imaging conditions. Examples of such unsatisfactory imaging conditions can include poor lighting, blurred images, too wide and/or too narrow field of view (e.g., position and/or angle of the camera may be faulty). Additionally or alternately, the image verification engine 348 can determine that the accessed image 128 shows unsatisfactory sample conditions. Examples of such unsatisfactory sample conditions can include the sample containing too many debris, the water of the sample being too opaque, the sample having too many organisms (e.g., a with too much overlapping), the organisms of the sample being too small or large, and/or the sample having organisms which are not sufficiently dispersed uniformly which can lead to clustering. As such, an alert may be generated when poor lighting, poor organism dispersion, poor water quality and/or overwhelming quantity of organisms are determined by the image verification engine 348.

In these cases, the software application 300 can be configured to display the alert 350 on the visual indicator 121 of the scale in order to notice an operator that image acquisition should be performed under different, better imaging and/or sample conditions (hereinafter simply referred to as "conditions"). The image verification engine 348 can be trained as well in some embodiments, in order to distinguish satisfactory conditions from unsatisfactory conditions.

However, it is understood that the image verification engine 348 can be omitted in alternate embodiments where the conditions during image acquisition are ensured to be satisfactory. For instance, in these embodiments, the light emitting device 111 can be configured to light the sample 104 in a predetermined, satisfactory manner during image acquisition so that the conditions are satisfactorily constant from one image to another.

In this specific embodiment, the organism detection engine 340 has been trained using supervised learning during which the organism detector engine 340 is trained to detect organism representations in a plurality of training images 352 each showing one or more organism representations and having detection truth data 354 associated to each of the training images 352, as best shown in FIG. 4.

In some embodiments, the training images 352 include a first set of training images each showing a single organism representation in different positions, in which case the detection truth data 354 include a label of the single organism representation in each of the training images 352 of the first set.

In some other embodiments, the training images 352 include a second set of training images 352 each showing a corresponding plurality of organism representations. In these embodiments, the detection truth data 354 include, for each of the training images 352 of the second set, a label of each of the plurality of organism representations in each of the training images 352 of the second set.

FIG. 5 shows an example of the organism detection engine 340, in accordance with an embodiment. As depicted, the organism detection engine 340 has a feature determination module 356 which is trained to determine a feature position associated to each organism representation 102' detected in the accessed image 128. In some embodiments, the feature position can be indicative of a position of one or more features associated to each organism representation 102'. For instance, in some embodiments, the feature(s) can be indicative of, but not limited to, a center of mass (or center of mass indicator) associated to an organism representation 102', an anatomical part associated to an organism representation 102', a given edge associated to an organism representation 102' and/or any other suitable organism-based feature. For instance, in embodiments where the feature is an anatomical part associated to an organism representation 102', the feature can be indicative of guts, heads and the like. In some specific embodiments, especially when the organisms are shrimps, the feature can be indicative of guts whereas in some other embodiments, especially when the organisms are fishes, the feature can be indicative of heads.

As can be understood, in this case, the detection data which are generated by the feature determination module 356 are indicative of the determined feature positions associated to the detected organism representations 102' in the accessed image 128.

In this example, the feature positions are provided in the form of an annotated image 358 including pixels of a first value or color representing the feature associated to each organism and pixels of a second value or color representing an absence of the feature of the detected organism representations 102'. However, in some other embodiments, the feature positions can equivalently be provided in the form of coordinates associated with each of the detected organism representations 102', coordinates associated with the pixels of the first value or color, and the like.

In embodiments where the feature determination module 356 is trained using supervised learning, training images and detection truth data such as shown in FIG. 4 can be convenient. In these embodiments, training images showing one or more organism representations are associated to detection truth data being indicative of feature positions of the organism representations in each of the training images. For instance, the detection truth data can be provided in the form of a training image which has been annotated (e.g., colored) to show the feature positions of the organism representations present in the corresponding training image.

FIG. 6 shows another example of the organism detection engine 340, in accordance with an embodiment. As shown, the organism detection engine 340 has a bounding box determination module 360 which is trained to determine coordinates of a box bounding each organism representation 102' detected in the accessed image 128.

In this embodiment, the detection data is indicative of the determined coordinates of the boxes associated to the detected organism representations 102' in the accessed image 128. For instance, in some embodiments, the detection data are provided in the form of an annotated image 362 including boxes 364 bounding each detected organism representation 102' in the accessed image 128.

In some other embodiments, the detection data are provided in the form of cropped images, such as cropped image 366, which represent the accessed image 128 being cropped about corresponding ones of the detected organism representations 102' and showing the corresponding box 364. In alternate embodiments, the detection data can include coordinates of the boxes 364, including coordinates of corners of the boxes 364 and the like.

In embodiments where the bounding box determination module 360 is trained using supervised learning, training images and detection truth data such as shown in FIG. 4 can be useful. In these embodiments, training images showing one or more organism representations are associated to detection truth data which are indicative of the coordinates of the boxes bounding each one of the organism representations in each of the training images. For instance, the detection truth data can be provided in the form of a training image which has been annotated to show the bounding box, or its corners, bounding each of the organism representations present in the corresponding training image.

FIG. 7 shows another example of the organism detection engine 340, in accordance with an embodiment. As illustrated, the organism detection engine 340 has a rotated bounding box determination module 368 which is trained to determine coordinates of a box rotated so as to snugly bound each organism representation 102' detected in the accessed image 128.

In this embodiment, the detection data is indicative of the determined coordinates of the rotated box associated to each detected organism representation 102' in the accessed image 128. Similarly to the embodiment of FIG. 6, the detection data can be provided in the form of an annotated image 370 including rotated boxes 372 snugly bounding each detected organism representation 102' in the accessed image 128.

In some other embodiments, the detection data are provided in the form of cropped images, such as cropped image 374 which represents the accessed image 128 being cropped about corresponding one of the detected organism representations 102' and showing the corresponding box 372. In some alternate embodiments, the detection data can include coordinates of the rotated bounding boxes, coordinates of corners of the rotated bounding boxes and the like.

In embodiments where the rotated bounding box determination module 368 is trained using supervised learning, training images and detection truth data such as shown in FIG. 4 can be provided. In these embodiments, training images showing one or more organism representations are associated to the detection truth data being indicative of the coordinates of the rotated boxes snugly bounding each one of the organism representations in each of the training images. For instance, the detection truth data can be provided in the form of a training image which has been annotated to show the rotated bounding box, or its corners, snugly bounding each of the organism representations present in the corresponding training image.

FIG. 8 shows another example of the organism detection engine 340, in accordance with an embodiment. In this example, the organism detection engine 340 has a mask determination module 376 configured to determine a mask exposing each organism representation 102' detected in the accessed image 128, in which case the detection data are indicative of the determined mask 378 associated to each detected organism representation 102' in the accessed image 128.

In embodiments where mask determination module 376 is trained using supervised learning, training images and detection truth data such as shown in FIG. 4 can also be required. In these embodiments, training images showing one or more organism representations are associated to detection truth data being indicative of the masks, or coordinates thereof, exposing corresponding ones of the organism representations in each of the training images. For instance, the detection truth data can be provided in the form of a plurality of mask images corresponding to the training image and differing from one another in that each mask image exposes a corresponding one of the plurality of organism representations present in the corresponding training image (e.g., by coloring the corresponding organism representation).

In some embodiments, for instance when only a single organism representation is present in a training image and the background is uniform, the detection truth data can be determined using computer vision engines involving conventional computer vision techniques such as adaptive thresholding. For each single organism representation in a training image, the detection truth data for feature position, bounding box, rotated bounding box and/or mask can thus be automatically generated in these embodiments. From those single organism representations and detection truth values, synthetic training images showing multiple organism representations can be obtained by adding several organism representations on top of a background image, and keeping the detection truth value for each of the organism representations added onto the background image.

As for the organism detection engine 340, the weight determination engine 344 too has been trained. More specifically, in this example, the weight determination engine 344 has been trained using supervised learning during which the organism weight determination engine 344 is trained to associate weight data to each organism representation detected in a plurality of training images showing one or more organism representations. Truth weight data are also associated to each of the training images to supervise the training of the weight determination engine 344, examples of which are shown and described with reference to FIGS. 9 to 14.

FIG. 9 shows an example of sets of training images associated to truth weight data which are provided in the form of weight truth values. As depicted, a first plurality of training images 380A showing a first organism representation in different positions is associated a first weight truth value W1, a second plurality of training images 380A showing a second organism representation in different positions is associated a second weight truth value W2, a third plurality of training images 380C showing a third organism representation in different positions is associated a third weight truth value W3, and so forth.

In this example, each of the first, second, and third weight truth values W1, W2 and W3 is indicative of a weight of a corresponding one of first, second and third organisms. The first, second and third weight truth values W1, W2 and W3 can stem from weight measurements made on the first, second and third organisms before or after acquisition of the corresponding training images.

FIG. 10 shows two training images 380A' and 380A" which are part of the first plurality of training images 380A shown in FIG. 9. In this example, the two training images 380A' and 380A" show a first organism representation 102' and are associated to the first weight truth value W1.

FIG. 11 shows an example of sets of training images associated to truth weight data being provided in the form of weight truth values. As depicted, a first plurality of cropped training images 382A showing a first organism representation in different positions is associated a first weight truth value W1, a second plurality of cropped training images 382B showing a second organism representation in different positions is associated a second weight truth value W2, a third plurality of cropped training images 382C showing a third organism representation in different positions is associated a third weight truth value W3, and so forth. In this example, each of the first, second, and third weight truth values W1, W2 and W3 is indicative of a weight of a corresponding one of first, second and third organisms. The first, second and third weight truth values W1, W2 and W3 can stem from weight measurements made on the first, second and third organisms before or after acquisition of the training images.

FIG. 12 shows two cropped training images 382A' and 382A" which are part of the first plurality of training images 382A shown in FIG. 12. In this example, the two training images 382A' and 382A" show a first organism representation 102' and are associated to the first weight truth value W1. As briefly discussed above, training images 382A' and 382A" have been modified by adding several synthetic organism representations 102" on top of an existing training image having a single organism representation 102'.

It is noted that in training images showing multiple organism representations, more than one organism representation can be present proximate to a cropped one of the organism representations. However, in these training images, the weight value associated to each organism representation may not be known. Accordingly, the weight determination engine 344 can be trained using training images showing a single organism representation 102' which are augmented with one or more synthetic organism representations 102" added proximate to the single organism representation 102'. In this way, by monitoring the detection truth value for each of the synthetic organism representations added onto the original training image, and that of the original organism representation, weight truth data can be obtained in association with the single organism representation even through the resulting training images show multiple organism representations.

FIG. 13 also shows an example of sets of training images associated to truth weight data being provided in the form of weight truth distribution. As illustrated, a first plurality of training images 384A showing a plurality of organism representations in different positions is associated to a first weight truth distribution D1, a second plurality of training images 384B showing a plurality of organism representations in different positions is associated to a second weight truth distribution D2, a third plurality of training images 384C showing a plurality of organism representations in different positions is associated to a third weight truth distribution D3, and so forth. The first, second and third weight truth distributions D1, D2 and D3 can originate from weight measurements of organisms present in the sample before or after acquisition of the training images.

The weight truth distribution can include an average weight value indicating an average of the weight values of all the organisms present in the sample, a standard deviation value indicative of a standard deviation in the weight values amongst all the organisms present in the sample, a coefficient of variation value indicative of a variation in the weight values amongst all the organisms present in the sample, a maximal weight value indicating the weight of the heaviest organism present in the sample, a minimal weight value indicating the weight of the lightest organism present in the sample, a total weight value indicative of a weight of a totality of the organisms present in the sample and/or any combination of information regarding the specific distribution of organism representations shown in the training images.

FIG. 14 shows two training images 384A' and 384A" which are part of the first plurality of training images 384A shown in FIG. 13. In this example, the two training images 384A' and 384A" show organism representations 102' and are associated to the first weight truth distribution D1, which may include an average weight value $\overline{W}$ and a standard deviation value $\sigma_W$.

In some embodiments, the organism weight determination engine 344 is configured to provide an output indicating the determined weight data on the accessed image 128. For instance, in some embodiments, the output includes one or more text strings which are overlaid on the accessed image 128, as shown in FIGS. 15A and 15B.

Figure 15B:
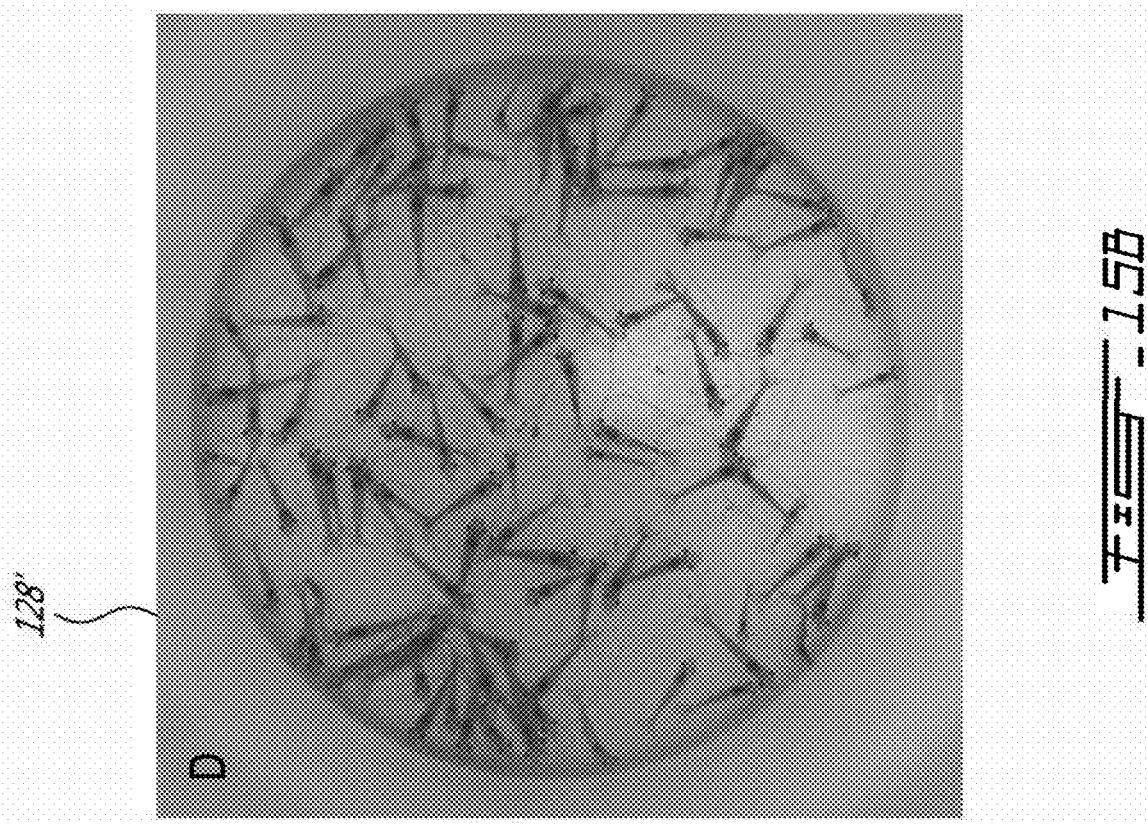
FIG. 15B is an example of an image over which a previously determined weight distribution has been overlaid, in accordance with an embodiment.
Figure 15A:
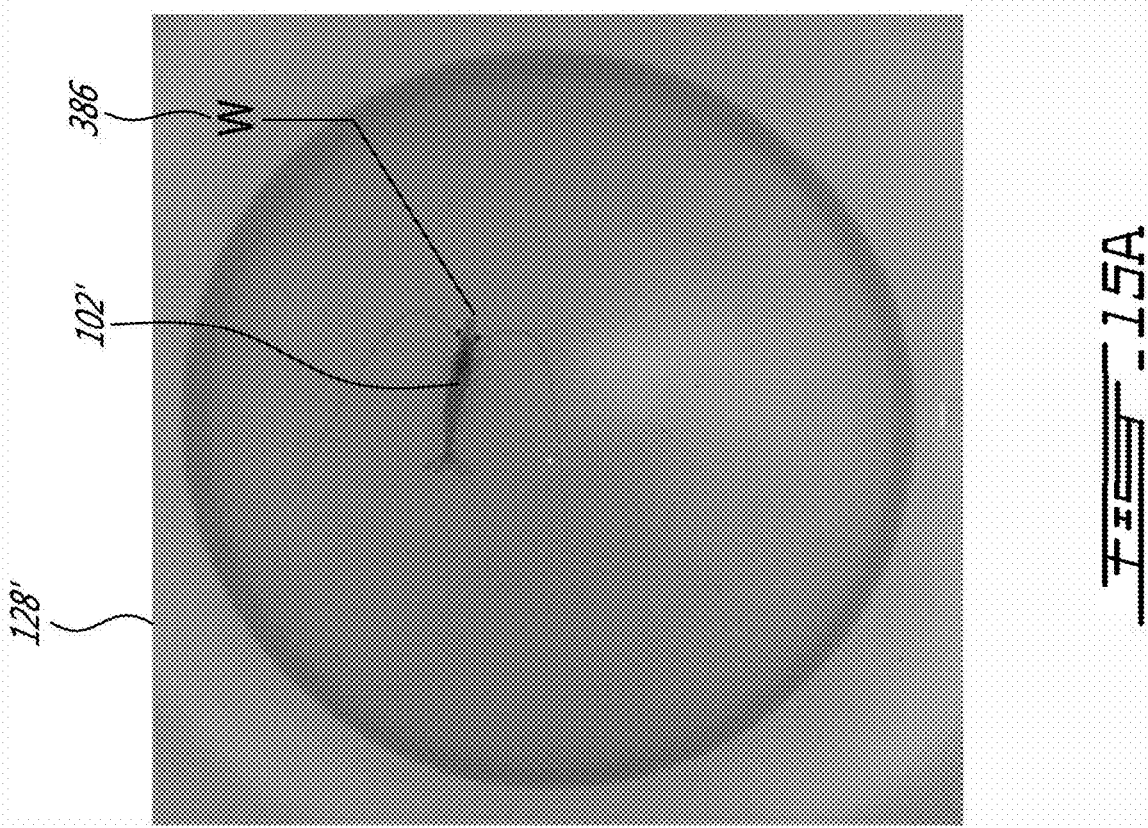
FIG. 15A is an example of an image over which a previously determined weight value has been overlaid, in accordance with an embodiment.

More specifically, FIG. 15A shows an example of an acquired image 128' onto which the organism weight determination engine 344 has overlaid an output in the form of a text string 386 indicating a weight value W over the image 128', the weight value W being indicative of the weight of the organism shown in the image 128'. In this particular example, the text string 386 is linked to an area proximate to the organism representation 102' (not shown).

FIG. 15B shows an example of an acquired image 128" onto which the organism weight determination engine 344 has overlaid an output in the form of a text string 388 over the image 128". More specifically, the text string 386 includes a weight distribution D which can be indicative of the average weight value and/or the standard deviation of the detected organism representations, and is positioned in a corner of the image 128" in this embodiment.

As can be understood, training the organism weight determination engine 344 using training images showing a single organism representation advantageously allows the organism weight determination engine 344 to determine a weight value to a particular organism representation, which would not be possible using the training images showing multiple organism representations as, during acquisition of these latter training images, organisms present in the sample are constantly moving from one image acquisition to another.

Figure 16:
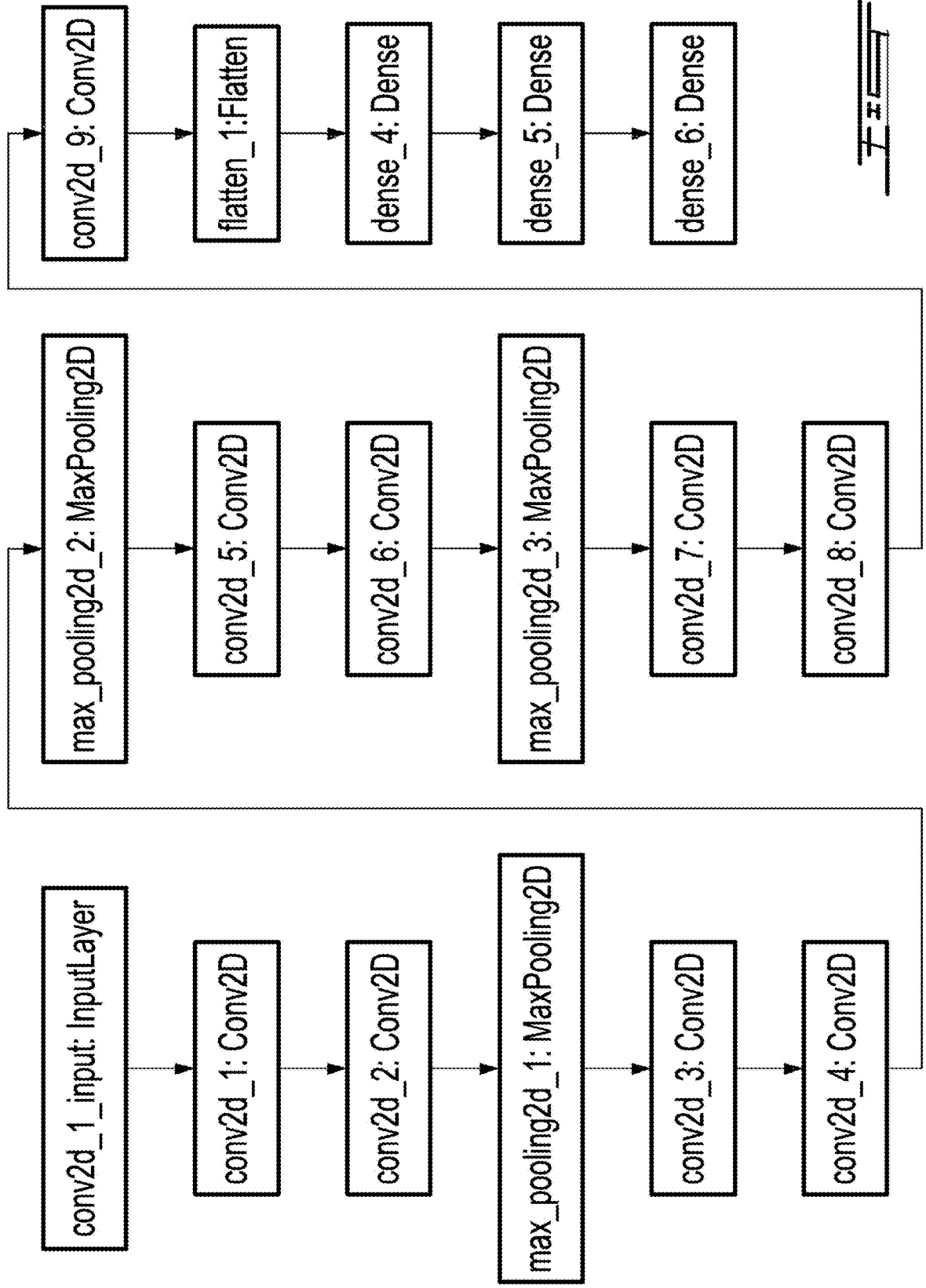
FIG. 16 is a flowchart of a first example of a series of convolutional layers applied on an acquired image by the weight determination engine of FIG. 3, in accordance with an embodiment.

FIG. 16 shows a flowchart of an example series of convolutional layers used in the weight determination engine 344 to determine the weight data. For instance, in this embodiment, the series of convolutional layers includes an InputLayer, Conv2D layers, MaxPooling 2D layers, a Flatten layer, and Dense layers.

Figure 17:
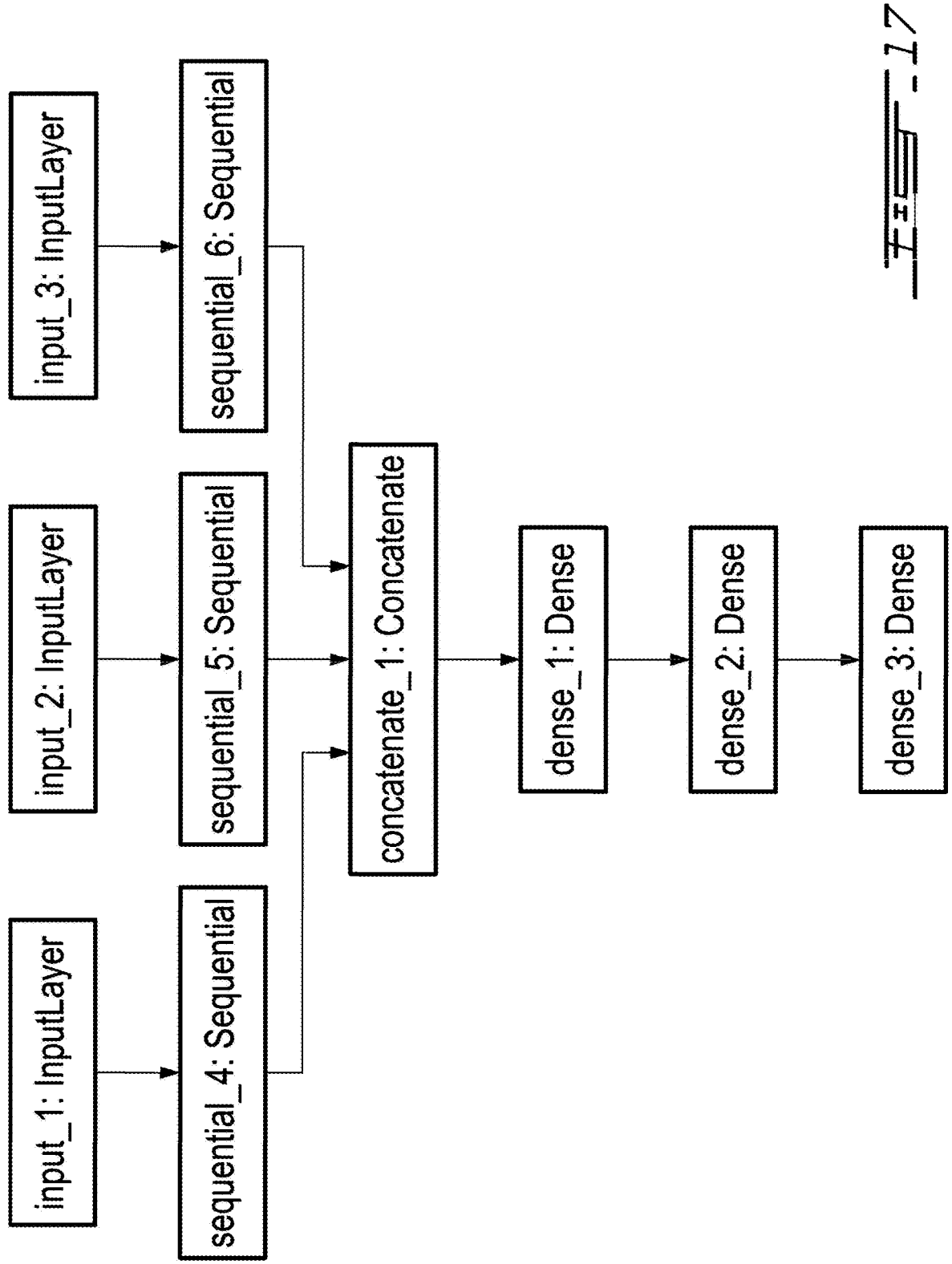
FIG. 17 is a flowchart of a second example of a series of convolutional layers applied on an acquired image by the weight determination engine of FIG. 3, in accordance with an embodiment.

The weight determination engine 344 can be able to accurately determine the weight of organisms having weight values that can vary by several orders of magnitude from the lighter to the heavier ones. For example, weight values of juvenile shrimps can vary from 0.01 g to 30 g in some embodiments. In order to train the weight determination engine 344 to be accurate across the whole range of weight values, the entire range can be divided in multiple subranges each having corresponding convolutional layers. The weight determination engine 344 can be trained for the convolutional layers of each subrange with a different size of the cropping about each organism representations in the training images. Then, the convolutional layers can be merged together and fully connected to one another in order to train the weight determination engine 344 across the full range of the weight values that can be expected, such as shown in FIG. 17.

It is intended that the weight distribution associated with an image can be calculated directly from the individual weight values. Although this can provide satisfactory results, residual errors may occur. In order to these residual errors, regression on the weight distribution can be performed. For example, the average weight and the standard deviation values can be used as inputs for the weight determination engine 344 during training to determine a more accurate version of the average weight and the standard deviation values.

The accuracy with which the weight values can be determined for some organism representations can vary if the organism representations are clustered with one another in an image. Accordingly, the weight determination engine 344 can be configured to calculate a clustering coefficient for each organism representation. This clustering coefficient can be seen as a measure of confidence in the training of the weight determination engine 344 to determine the corresponding weight value with a given accuracy. For instance, if an organism representation is surrounded by too many others, the clustering coefficient can be above a threshold, which may not impact the determination of the weight distribution. Clustering can be represented as a function varying with the amount of organism representations which are close to a given organism representation and the number of organism representations in the image. A minimal percentage of organism representations may be kept in order to ensure enough organism representations are used for a statistically accurate determination of the weight distribution.

Another approach can be applied to enhance the accuracy of the weight determinations by using a histogram of the weight distribution to determine a histogram closer to the real weight distribution. In this embodiment, the new distribution is then used to directly determine the weight distribution. This histogram method can allow having fixed input and fixed output sizes for the weight determination engine 344, which can be trained to learn patterns in the weight distribution to minimize previous errors leaking in the weight distribution.

The computing device 200 and the software application 300 described above are meant to be examples only. Other suitable embodiments of the controller 112 can also be provided, as it will be apparent to the skilled reader.

Indeed, as mentioned above, the trained engines 340 and 344 are trained using supervised learning. In such supervised learning, each training image in the set of training images may be associated with a label while training. Supervised machine learning engines can be based on Artificial Neural Networks (ANN), Support Vector Machines (SVM), capsule-based networks, Linear Discriminant Analysis (LDA), classification tree, a combination thereof, and any other suitable supervised machine learning engine. However, as can be understood, in some other embodiments, it is intended that the trained engines 340 and 344 can be trained using unsupervised where only training images are provided (no desired or truth outputs are given), so as to leave the trained engines 340 and 344 find a structure or resemblances in the provided training images. For instance, unsupervised clustering algorithms can be used. Additionally or alternately, the trained engines 340 and 344 can involve reinforcement learning where the trained engines 340 and 344 interact with example training images and when they reach desired or truth outputs, the trained engines 340 and 344 are provided feedback in terms of rewards or punishments. Two exemplary methods for improving classifier performance include boosting and bagging which involve using several classifiers together to "vote" for a final decision. Combination rules can include voting, decision trees, and linear and nonlinear combinations of classifier outputs. These approaches can also provide the ability to control the tradeoff between precision and accuracy through changes in weights or thresholds. These methods can lend themselves to extension to large numbers of localized features. In any case, some of these engines may require human interaction during training, or to initiate the engine, however human interaction may not be required while the engine is being carried out, e.g., during analysis of an accessed image. See Nasrabadi, Nasser M. "Pattern recognition and machine learning." Journal of electronic imaging 16.4 (2007): 049901 for further detail concerning such trained engines.

FIG. 18 shows an example of a scale 400, in accordance with an embodiment. As depicted, the scale 400 has a camera 410 having a field of view 420 orientable towards the sample 404 and which is configured for acquiring an image of the one or more organisms 402 of the sample 404. The scale 400 has a controller 412 having a memory on which are stored the software program such as the one described with reference to FIG. 3. In this particular embodiment, the scale 400 has a structure 408, or frame, to which the camera 410 and the controller 412 are mounted. More specifically, the structure 408 is provided in the form of a mobile device, such as a smart phone or an electronic tablet.

Accordingly, in this embodiment, the scale 400 can be handled by a user to acquire an image 428 of the sample 404, after which the acquired image 428 can be processed by the controller 412 to determine weight data concerning the organisms 402 of the sample 404 on the go.

In contrast with the embodiment of FIG. 1, which provided a predetermined, constant distance d between the camera and the sample, the maneuverability of the scale 400 may cause challenges in suitably referencing the sample 404 with respect to the scale 400. Accordingly, at least one reference object 491 may be positioned in the field of view 420 of the camera 410 proximate to the sample 404 so that a sample referencing engine being stored on the memory of the controller 412 can localize a position and an orientation of the sample 404 relative to the camera 410 based on the accessed image 428 including the reference object(s) 491. In some embodiments, the sample referencing engine is trained using either supervised learning or unsupervised learning. As such, the organism weight determination engine can factor in the position and the orientation of the sample relative to the camera 410, which can impact the weight determination. As can be understood, the sample referencing engine can be trained using training images showing organism representations which are associated to different position and orientation truth values. An example of such sample referencing engine is shown at 347 in the software program 300 of FIG. 3. Examples of such reference objects 491 can include, but not limited to, a container having known dimensions receiving the organisms, a geometric object having known dimensions (e.g., a square marker of particular color/pattern), a known arrangement of reference objects, where the relative distance(s) between the reference objects is known, and/or any other suitable reference object(s). It is intended that the scale 400 can include an image verification engine such as the one discussed above in order to, for instance, generate an alert when the imaging and/or sample conditions are unsatisfactory. In some embodiments, the image verification engine can generate an alert when the field of view of the camera 410 is unsatisfactory, e.g., when the field of view is too zoomed-in or too zoomed-out. In such an embodiment, the field of view may be considered to be unsatisfactory when it does not encompass the reference object(s) 491. The scale 400 may display an instruction to zoom-in or zoom-out the field of view of the camera 410. In situations where the field of view of too zoomed-in, the instruction may be displayed until the reference object(s) 491 appear(s) in the field of view.

Referring now to FIG. 19, in some embodiments, the scale 400 may be accessible remotely from any one of a plurality of external devices 490 over connections 492. External devices 490 may be any one of a desktop, a laptop, a tablet, a smartphone, and the like. External devices 490 may have a software application such as software application 300 of FIG. 3 provided wholly or partly thereon as a downloaded software application, a firmware application, or a combination thereof, for accessing the scale 400. Alternatively, external devices 490 may access the scale 400 via a web application, accessible through any type of Web browser.

The connections 492 may comprise wire-based technology, such as electrical wires or cables, and/or optical fibers. The connections 492 may also be wireless, such as RF, infrared, Wi-Fi, Bluetooth, and others. The connections 492 may therefore comprise a network, such as the Internet, the Public Switch Telephone Network (PSTN), a cellular network, or others known to those skilled in the art. Communication over the network may occur using any known communication protocols that enable external devices 490 within a computer network to exchange information. The Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

In some embodiments, the software program 300 of FIG. 3 is provided at least in part on any one of external devices 490. For example, the software program 300 may be configured as a first portion provided in the scale 400 (or the scale 100) to obtain and transmit the inputs such as the image and/or the detection data to a second portion, provided on one of the external devices 490. The second portion may be configured to receive the inputs such as the image and/or the detection data, and perform the steps carried by the organism weight determination engine on one of the external devices 490. Alternatively, the software program 300 is provided entirely on any one of the external devices 490 and is configured to receive an image from a remote scale. Also alternatively, the scale 400 can be configured to transmit, via connections 492, one or more of inputs such as the image, the detection data and/or the weight data. Other embodiments may also apply.

One or more databases 494, such as databases 494A, 494B and/or 494C may be provided locally on any one of the scale 100 and the external devices 490, or may be provided separately therefrom (as illustrated). In the case of a remote access to the databases 494, access may occur via the connections 492 taking the form of any type of network, as indicated above. The various databases 494 described herein may be provided as collections of data or information organized for rapid search and retrieval by a computer. The databases 494 may be structured to facilitate storage, retrieval, modification, and deletion of data in conjunction with various data-processing operations. The databases 494 may be any organization of data on a data storage medium, such as one or more servers. The databases 494 illustratively have stored therein raw data representing training images and associated detection truth data and/or weight truth data.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

As can be understood, the examples described above and illustrated are intended to be exemplary only. For instance, although the scale described herein have been used to determine weight, the scale described herein can be adapted in systems and methods for determining a quantity, an estimated unitary volume, a biomass, an appearance-related variable of interest such as a color, pigmentation and the like, a presence of a disease, a depth, a position, a volume, a length, a width, an area and other variables of interest used in the field of aquaculture. The scope is indicated by the appended claims.

What is claimed is:

1. A scale for determining weight of a cluster of shrimps contained in a sample, the scale comprising:
a camera having a field of view orientable towards the sample and being configured for acquiring an image of the cluster of shrimps of the sample;
a controller having a memory and a processor configured to perform the steps of:
accessing the acquired image;
using a shrimp detection engine being stored on the memory and being trained, detecting a plurality of shrimp representations in one or more corresponding portions of the accessed image and generating detection data concerning the plurality of detected shrimp representations; and
using a shrimp weight determination engine being stored on the memory and being trained, determining weight data concerning weight associated to the plurality of detected shrimp representations based on the detection data, the weight data provided in the form of a weight distribution associating quantities of shrimp representations detected in the accessed image to corresponding different weight ranges.

2. The scale of claim 1 wherein the shrimp detection engine includes a feature determination module being trained to determine a feature position associated to each shrimp representation detected in the accessed image, the detection data being indicative of the determined feature position of each detected shrimp representation in the accessed image.

3. The scale of claim 1 wherein the shrimp detection engine includes a bounding box determination module being trained to determine coordinates of a box bounding each shrimp representation detected in the accessed image, the detection data being indicative of the determined coordinates of the box of each detected shrimp representation in the accessed image.

4. The scale of claim 1 wherein the shrimp detection engine includes a mask determination module configured to determine a mask exposing each shrimp representation detected in the accessed image, the detection data being indicative of the determined mask associated to each detected shrimp representation in the accessed image.

5. The scale of claim 1 wherein the shrimp detection engine has been trained using supervised learning during which the shrimp detector engine is trained to detect shrimp representations in a plurality of training images each showing a plurality of shrimp representations and having detection truth data associated to each of the training images.

6. The scale of claim 5 wherein the plurality of training images comprises a first set of training images each showing a single shrimp representation in different positions, the detection truth data including a label of the single shrimp representation in each of the training images of the first set.

7. The scale of claim 5 wherein the plurality of training images comprises a second set of training images each showing a corresponding plurality of shrimp representations, the detection truth data including, for each of the training images of the second set, a label of each of the plurality of shrimp representations in each of the training images of the second set.

8. The scale of claim 1 wherein the shrimp weight determination engine has been trained using supervised learning during which the shrimp weight determination engine is trained to associate weight data to each shrimp representation detected in a plurality of training images showing a plurality of shrimp representations and having truth weight data associated to each of the training images.

9. The scale of claim 8 wherein the plurality of training images comprises a first set of training images each showing a single shrimp representation in different positions, the truth weight data including a weight value of the single shrimp representation.

10. The scale of claim 8 wherein the plurality of training images comprises a second set of training images each showing a corresponding plurality of shrimp representations, the truth weight data including, for each of the training images of the second set, at least one of a total weight value indicating a weight of a totality of the plurality of shrimp representations in the corresponding training image and a weight distribution indicating a weight distribution of the plurality of shrimp representations in the corresponding training image.

11. The scale of claim 1 further comprising an image verification engine being stored on the memory and being configured to generate an alert upon determination that the accessed image is unsatisfactory.

12. The scale of claim 1 further comprising at least one reference object positioned in the field of view of the camera proximate to the sample, the controller being configured to perform:
using a sample referencing engine being stored on the memory, localizing a position and an orientation of the sample relative to the camera based on the accessed image including the reference object.

13. The scale of claim 12 wherein at least the shrimp weight determination engine factors in the position and the orientation of the sample relative to the camera.

14. The scale of claim 1 further comprising a structure to which are mounted the camera and the controller, the structure being a structure of a mobile electronic device.

15. The scale of claim 14 wherein the structure is a structure of a lid which is securable to a container having a contour wall and a bottom containing the sample, the contour wall and the bottom are part of a bucket having an open upper end, the lid being removably securable to the open upper end of the bucket, the contour wall, the bottom, and the lid being opaque to prevent intrusion of ambient light inside the container, and an inner face of the contour wall and of the bottom being light reflective, the scale further including a light emitting device configured to provide given lighting conditions when the image is acquired by the camera.

16. The scale of claim 1 wherein the shrimp weight determination engine calculates a clustering coefficient for each shrimp representation, the clustering coefficient being a measure of confidence in said determining of said weight data.

17. The scale of claim 1 wherein the weight determination engine is trained to associate the plurality of shrimp representations to a plurality of corresponding image cropping size ranges, the weight determination engine determining the weight data for the plurality of shrimp representations in each of the image cropping size ranges independently from one another based on corresponding training data.

18. The scale of claim 1 wherein the detection engine distinguish the plurality of shrimp representations in the accessed image using an unsupervised clustering detection module.

19. A computer-implemented method for determining weight of a cluster of shrimps contained in a sample, the method comprising:
   using a controller having a memory and a processor,
      receiving an image of the cluster of shrimps of the sample;
      accessing the acquired image;
      using a shrimp detection engine being stored on the memory and being trained, detecting a plurality of shrimp representations in one or more corresponding portions of the accessed image and generating detection data concerning the plurality of detected shrimp representations; and
      using a shrimp weight determination engine being stored on the memory and being trained, determining weight data concerning weight associated to the plurality of detected shrimp representations based on the detection data, the weight data provided in the form of a weight distribution associating quantities of shrimp representations detected in the accessed image to corresponding different weight ranges.

20. The computer-implemented method of claim 19 wherein the shrimp weight determination engine calculates a clustering coefficient for each shrimp representation, the clustering coefficient being a measure of confidence in said determining of said weight data.

21. The computer-implemented method of claim 19 The scale of claim 1 wherein the weight determination engine is trained to associate the plurality of shrimp representations to a plurality of corresponding image cropping size ranges, the weight determination engine determining the weight data for the plurality of shrimp representations in each of the image cropping size ranges independently from one another based on corresponding training data.

* * * * *